United States Patent
Altshuler et al.

(10) Patent No.: US 9,771,675 B2
(45) Date of Patent: *Sep. 26, 2017

(54) PATTERNED AIR-LAID NONWOVEN FIBROUS WEBS AND METHODS OF MAKING AND USING SAME

(75) Inventors: Gordon L. Altshuler, Sunfish Lake, MN (US); James P. Endle, New Richmond, WI (US); David L. Vall, Woodbury, MN (US); Gerry A. Hoffdahl, Scandia, MN (US); Randy L. Robertson, North St. Paul, MN (US); Tien T. Wu, Woodbury, MN (US); Mario A. Perez, Burnsville, MN (US); Jeremie Peyras-Carratte, Pont Sainte Maxence (FR); Jean-Marie Coant, Saint-Denis (FR); Lahoussaine Lalouch, Noyon (FR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/808,106

(22) PCT Filed: Jul. 6, 2011

(86) PCT No.: PCT/US2011/042995
§ 371 (c)(1),
(2), (4) Date: Jan. 3, 2013

(87) PCT Pub. No.: WO2012/006300
PCT Pub. Date: Jan. 12, 2012

(65) Prior Publication Data
US 2013/0101805 A1    Apr. 25, 2013

Related U.S. Application Data

(60) Provisional application No. 61/362,191, filed on Jul. 7, 2010.

(51) Int. Cl.
*D04H 5/06* (2006.01)
*D04H 5/08* (2012.01)
(Continued)

(52) U.S. Cl.
CPC ............. *D04H 1/72* (2013.01); *B32B 3/10* (2013.01); *B32B 3/14* (2013.01); *B32B 3/30* (2013.01);
(Continued)

(58) Field of Classification Search
USPC .......................................................... 428/168
See application file for complete search history.

(56) References Cited

U.S. PATENT DOCUMENTS 1,975,504 A    10/1934   Formhals
3,009,823 A *  11/1961   Drelich .................... D04H 1/66
                                                     427/282
(Continued)

FOREIGN PATENT DOCUMENTS

CN         1122150        5/1996
CN         101688342      3/2010
(Continued)

*Primary Examiner* — Aaron Austin
*Assistant Examiner* — Zheren J Yang
(74) *Attorney, Agent, or Firm* — James A. Baker

(57) ABSTRACT

Nonwoven fibrous webs including randomly oriented discrete fibers defining a multiplicity of non-hollow projections extending from a major surface of the nonwoven fibrous web (as considered without the projections), and a plurality of substantially planar land areas formed between each adjoining projection in a plane defined by and substantially parallel with the major surface. In some exemplary embodiments, the randomly oriented discrete fibers include multi-component fibers having at least a first region having a first melting temperature and a second region having a second melting temperature, wherein the first melting temperature is
(Continued)

less than the second melting temperature. At least a portion of the oriented discrete fibers are bonded together at a plurality of intersection points with the first region of the multi-component fibers. In certain embodiments, the patterned air-laid nonwoven fibrous webs include particulates. Methods of making and using such patterned air-laid nonwoven fibrous webs are also disclosed.

9 Claims, 10 Drawing Sheets

(51) Int. Cl.
   D04H 1/72      (2012.01)
   B32B 5/08      (2006.01)
   B32B 3/30      (2006.01)
   B32B 3/14      (2006.01)
   B32B 3/10      (2006.01)
   B32B 5/02      (2006.01)
   D04H 1/54      (2012.01)
   D04H 1/541     (2012.01)
   D04H 1/593     (2012.01)
   D04H 13/00     (2006.01)
   D04H 1/732     (2012.01)
   D04H 1/407     (2012.01)
   D04H 1/413     (2012.01)
   D04H 1/4382    (2012.01)

(52) U.S. Cl.
   CPC .......... B32B 5/022 (2013.01); B32B 5/08 (2013.01); D04H 1/407 (2013.01); D04H 1/413 (2013.01); D04H 1/4382 (2013.01); D04H 1/54 (2013.01); D04H 1/541 (2013.01); D04H 1/593 (2013.01); D04H 1/732 (2013.01); D04H 13/00 (2013.01); Y10T 428/2457 (2015.01); Y10T 428/24479 (2015.01); Y10T 428/24579 (2015.01); Y10T 428/24612 (2015.01); Y10T 428/24802 (2015.01); Y10T 428/24893 (2015.01)

(56) References Cited

U.S. PATENT DOCUMENTS

| | | | |
|---|---|---|---|
| 3,516,941 A | 6/1970 | Matson | |
| 3,802,817 A | 4/1974 | Matsuki et al. | |
| 3,874,886 A | 4/1975 | Levecque et al. | |
| 3,934,588 A | 1/1976 | Mesek et al. | |
| 4,027,672 A * | 6/1977 | Karami | 604/380 |
| 4,100,324 A * | 7/1978 | Anderson | C11D 17/049 156/167 |
| 4,103,058 A | 7/1978 | Humlicek | |
| 4,118,531 A | 10/1978 | Hauser | |
| 4,135,024 A * | 1/1979 | Callahan | D04H 1/44 101/32 |
| RE30,061 E * | 7/1979 | Shepherd | D04H 1/68 156/78 |
| 4,207,367 A * | 6/1980 | Baker, Jr. | D04H 1/66 428/171 |
| 4,215,682 A | 8/1980 | Kubik | |
| 4,252,590 A | 2/1981 | Rasen et al. | |
| 4,328,275 A * | 5/1982 | Vargo | A47G 27/0225 4/251.1 |
| 4,363,646 A | 12/1982 | Torobin | |
| 4,536,361 A | 8/1985 | Torobin | |
| 4,552,603 A | 11/1985 | Harris, Jr. et al. | |
| 4,640,810 A | 2/1987 | Laursen et al. | |
| 4,729,371 A | 3/1988 | Krueger et al. | |
| 4,741,941 A | 5/1988 | Englebert et al. | |
| 4,818,464 A | 4/1989 | Lau | |
| 5,013,309 A * | 5/1991 | Baigas et al. | 604/368 |
| 5,082,720 A * | 1/1992 | Hayes | 442/362 |
| 5,114,787 A | 5/1992 | Chaplin et al. | |
| 5,167,765 A | 12/1992 | Nielsen et al. | |
| 5,227,107 A | 7/1993 | Dickenson et al. | |
| 5,277,976 A | 1/1994 | Hogle et al. | |
| 5,332,426 A | 7/1994 | Tang et al. | |
| 5,350,620 A | 9/1994 | Sundet | |
| 5,486,410 A * | 1/1996 | Groeger | A62D 5/00 428/331 |
| 5,575,874 A * | 11/1996 | Griesbach, III | A61F 13/15658 156/167 |
| 5,643,653 A | 7/1997 | Griesbach, III et al. | |
| 5,662,728 A | 9/1997 | Groeger | |
| 5,858,512 A * | 1/1999 | Dit Picard | D04H 1/62 428/170 |
| 5,858,515 A | 1/1999 | Stokes et al. | |
| 5,972,463 A * | 10/1999 | Martin | B24D 11/005 428/373 |
| 5,972,808 A | 10/1999 | Groeger et al. | |
| 6,017,831 A * | 1/2000 | Beardsley | B24D 3/28 442/148 |
| 6,057,256 A | 5/2000 | Krueger et al. | |
| 6,093,665 A | 7/2000 | Sayovitz et al. | |
| 6,114,017 A | 9/2000 | Fabbricante et al. | |
| 6,183,670 B1 | 2/2001 | Torobin et al. | |
| 6,315,806 B1 | 11/2001 | Torobin et al. | |
| 6,382,526 B1 | 5/2002 | Reneker et al. | |
| 6,468,626 B1 * | 10/2002 | Takai | A61F 13/512 428/131 |
| 6,533,989 B1 | 3/2003 | Wisneski et al. | |
| 6,607,624 B2 | 8/2003 | Berrigan et al. | |
| 6,743,273 B2 | 6/2004 | Chung et al. | |
| 6,800,226 B1 | 10/2004 | Gerking | |
| 6,808,664 B2 | 10/2004 | Falk et al. | |
| 6,861,025 B2 | 3/2005 | Erickson et al. | |
| 6,875,710 B2 * | 4/2005 | Eaton | A61F 13/4902 428/100 |
| 6,921,570 B2 | 7/2005 | Belau et al. | |
| 7,195,810 B1 * | 3/2007 | Schmidt | A61F 13/533 162/109 |
| 7,491,354 B2 | 2/2009 | Andersen | |
| 7,695,660 B2 | 4/2010 | Berrigan et al. | |
| 8,613,995 B2 * | 12/2013 | Stone | B26F 1/26 428/156 |
| 2001/0051754 A1 | 12/2001 | Lissy | |
| 2002/0099347 A1 * | 7/2002 | Chen | A61F 13/512 604/369 |
| 2003/0119404 A1 | 6/2003 | Belau et al. | |
| 2003/0199219 A1 * | 10/2003 | Hayes | D04H 1/70 442/401 |
| 2004/0049145 A1 | 3/2004 | Flick | |
| 2004/0058607 A1 | 3/2004 | Bodaghi | |
| 2004/0098838 A1 | 5/2004 | Venturino et al. | |
| 2004/0116031 A1 * | 6/2004 | Brennan | D04H 1/465 442/401 |
| 2005/0070866 A1 * | 3/2005 | Isele | A61F 13/15658 604/367 |
| 2005/0266760 A1 * | 12/2005 | Chhabra | A61F 13/15 442/417 |
| 2006/0008621 A1 * | 1/2006 | Gusky | D04H 1/00 428/156 |
| 2006/0063456 A1 | 3/2006 | Carter | |
| 2006/0194027 A1 * | 8/2006 | Pourdeyhimi | B29C 51/004 428/179 |
| 2007/0049153 A1 * | 3/2007 | Dunbar | A47L 13/16 442/400 |
| 2007/0172628 A1 * | 7/2007 | Seth | B32B 5/04 428/85 |
| 2007/0202768 A1 * | 8/2007 | Haskett | A47L 13/16 442/327 |
| 2008/0038976 A1 | 2/2008 | Berrigan et al. | |
| 2008/0318004 A1 * | 12/2008 | Ruhe | A61K 8/0208 428/171 |
| 2009/0061709 A1 * | 3/2009 | Nakai et al. | 442/170 |
| 2009/0065436 A1 * | 3/2009 | Kalayci | B01D 39/1623 210/679 |
| 2009/0068409 A1 * | 3/2009 | Bret | A61K 8/0208 428/166 |
| 2009/0233049 A1 * | 9/2009 | Jackson | A47L 13/16 428/156 |

(56) References Cited

U.S. PATENT DOCUMENTS

| | | | | |
|---|---|---|---|---|
| 2009/0258190 A1* | 10/2009 | Evers Smith | ............. | D01F 6/14 |
| | | | | 428/156 |
| 2010/0291213 A1* | 11/2010 | Berrigan | ................. | D04H 1/42 |
| | | | | 424/484 |
| 2011/0151196 A1* | 6/2011 | Schmidt | .................. | A47L 13/16 |
| | | | | 428/172 |
| 2011/0152164 A1* | 6/2011 | Close | ................... | C11D 17/049 |
| | | | | 510/441 |
| 2012/0107567 A1* | 5/2012 | Terada | .............. | A61F 13/51104 |
| | | | | 428/156 |
| 2012/0149273 A1 | 6/2012 | Moore et al. | | |

FOREIGN PATENT DOCUMENTS

| | | |
|---|---|---|
| EP | 1 160 367 | 12/2001 |
| EP | 1211342 A1 | 6/2002 |
| EP | 1 323 857 | 7/2003 |
| EP | 2039816 A1 | 3/2009 |
| JP | H05-220313 A | 8/1993 |
| JP | H09-067749 A | 3/1997 |
| JP | 2003-064563 A | 3/2003 |
| JP | 2004-052116 A | 2/2004 |
| JP | 2005-533644 A | 11/2005 |
| JP | 2007-509772 A | 4/2007 |
| JP | 2009-215682 | 9/2009 |
| WO | WO 94/11556 A1 | 5/1994 |
| WO | WO 99/61518 A1 | 12/1999 |
| WO | WO 00/29656 | 5/2000 |
| WO | WO 2005/044529 A1 | 5/2005 |
| WO | WO 2008/085545 | 7/2008 |
| WO | WO 2010/074982 A1 | 7/2010 |

\* cited by examiner

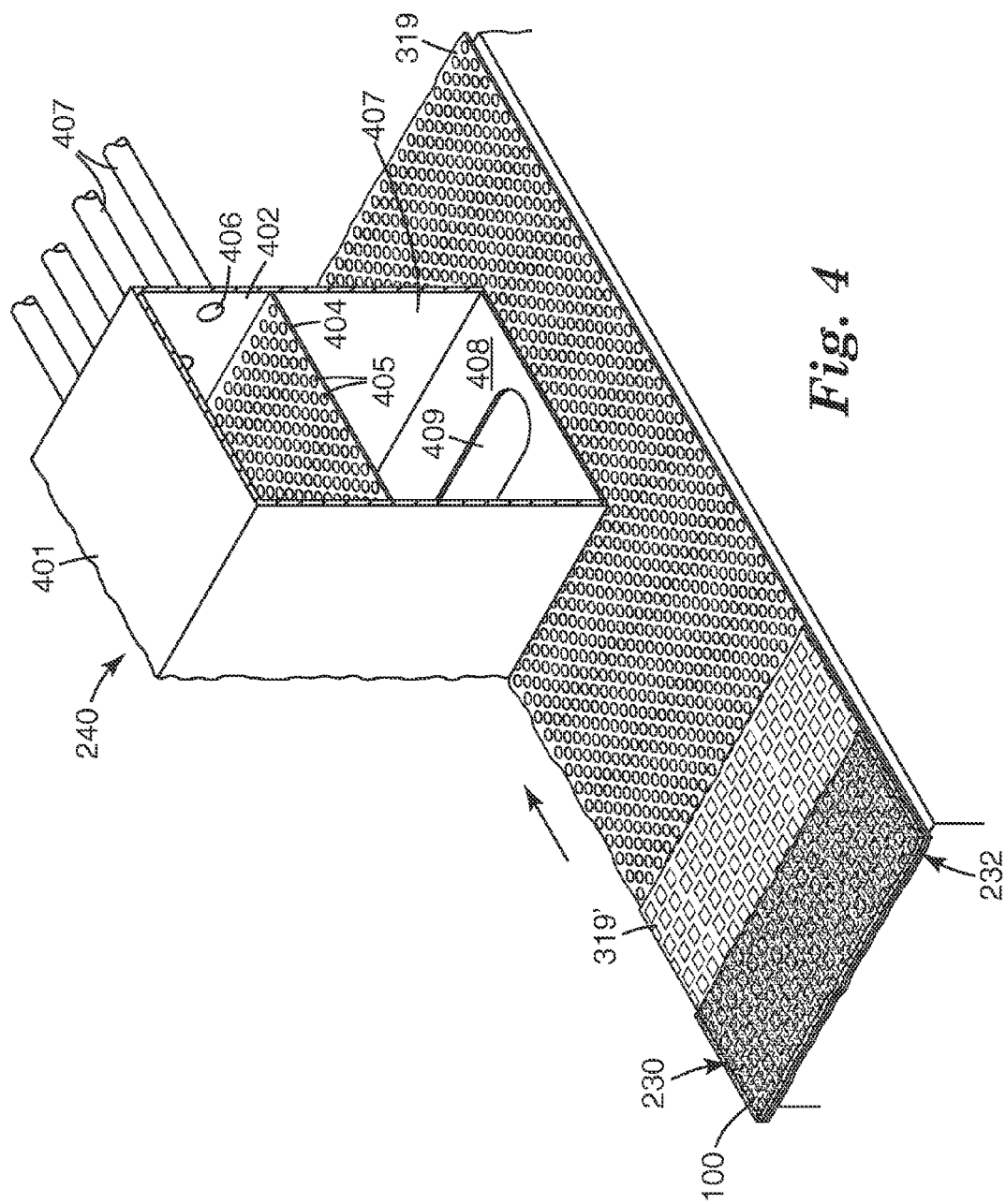

PATTERNED AIR-LAID NONWOVEN FIBROUS WEBS AND METHODS OF MAKING AND USING SAME

CROSS REFERENCE TO RELATED APPLICATION

This application claims the benefit of U.S. Provisional Patent Application No. 61/362,191, filed Jul. 7, 2010, the disclosure of which is incorporated by reference herein in its entirety.

TECHNICAL FIELD

The present disclosure relates to air-laid nonwoven fibrous webs including discrete randomly oriented fibers captured in an identifiable pattern and bonded together, and methods of making and using such webs.

BACKGROUND

Nonwoven webs have been used to produce a variety of articles useful, for example, as absorbent wipes or abrasive scrubbers for surface cleaning, as wound dressings, as gas and liquid absorbent or filtration media, as barrier materials for heat or sound absorption, and as floor mats. In some applications, it may be desirable to use a shaped nonwoven web. For example, U.S. Pat. Nos. 5,575,874 and 5,643,653 (Griesbach, III et al.) disclose shaped nonwoven fabrics and methods of making such shaped nonwoven webs. In other applications, it may be desirable to use a nonwoven web having a textured surface, for example, as a nonwoven fabric in which the fibers are pattern bonded with an adhesive binder material, as described in U.S. Pat. No. 6,093,665 (Sayovitz et al.); or in which a meltblown fiber layer is formed on a patterning belt and subsequently laminated between two air-laid fiber layers.

U.S. Pat. No. 5,858,515 (Stokes), U.S. Pat. No. 6,921,570 (Belau), and U.S. Patent Application Publication No. 2003/0119404 (Belau) describe lamination methods, some of which include use of patterned nip rollers, for producing structured multi-layer nonwoven webs from two or more meltblown fiber webs. The use of a patterned template, roller or belt to form a structured web from meltblown or melt-spun fibers or filaments has been described, for example, in U.S. Pat. No. 4,103,058 (Humlicek), U.S. Pat. No. 4,252,590 (Rasen et al.), U.S. Pat. No. 4,741,941 (Englebert et al.); EP Patent Application Nos. 1 160 367 A2 and 1 323 857 A2; and PCT International Publication No. WO 00/29656 (Bontaites).

SUMMARY

In one aspect, the disclosure describes a nonwoven fibrous web including a multiplicity of randomly oriented discrete fibers defining a multiplicity of non-hollow projections extending from a major surface of the nonwoven fibrous web (as considered without the projections), and a multiplicity of substantially planar land areas formed between each adjoining projection in a plane defined by and substantially parallel with the major surface.

In some exemplary embodiments, the randomly oriented discrete fibers include multi-component fibers having at least a first region having a first melting temperature and a second region having a second melting temperature, wherein the first melting temperature is less than the second melting temperature. At least a portion of the oriented discrete fibers are bonded together at a multiplicity of intersection points with the first region of the multi-component fibers.

In other exemplary embodiments, the randomly oriented discrete fibers includes a first population of monocomponent discrete thermoplastic fibers having a first melting temperature, and a second population of monocomponent discrete fibers having a second melting temperature greater than the first melting temperature. At least a portion of the first population of monocomponent discrete fibers is bonded to at least a portion of the second population of monocomponent discrete fibers.

In exemplary nonwoven fibrous webs of the previously described embodiments, the webs may further include a multiplicity of particulates. At least a portion of the particulates is bonded to the at least first region of at least a portion of the multi-component fibers or the first population of monocomponent discrete fibers. In some exemplary embodiments, the multiplicity of particulates includes benefiting particulates selected from abrasive particulates, metal particulates, detergent particulates, surfactant particulates, biocide particulates, adsorbent particulates, absorbent particulates, microcapsules, and combinations thereof. In certain exemplary embodiments, the benefiting particulates include chemically active particulates selected from activated carbon particulates, activated alumina particulates, silica gel particulates, desiccant particulates, anion exchange resin particulates, cation exchange resin particulates, molecular sieve particulates, diatomaceous earth particulates, antimicrobial compound particulates, and combinations thereof. In some particular exemplary embodiments, the chemically active particulates are distributed substantially throughout an entire thickness of the nonwoven fibrous web. In other particular exemplary embodiments, the chemically active particulates are distributed substantially on a surface of the multiplicity of non-hollow projections.

Exemplary embodiments of chemically active particulate-loaded nonwoven fibrous webs according to the present disclosure may have structural features that enable their use in a variety of applications, have exceptional adsorbent and/or absorbent properties, exhibit high porosity and permeability due to their low Solidity, and/or be manufactured in a cost-effective manner. Certain exemplary embodiments of the chemically active particulate-loaded nonwoven fibrous webs according to the present disclosure may provide compact and low cost fluid filtration articles, for example, water filters for home use, or air filters for use as respirators or as filters for HVAC applications.

Additionally, in some exemplary embodiments, the chemically active particulate-loaded nonwoven fibrous webs according to the present disclosure may enable the manufacture of fluid filtration articles that have high loadings of chemically active particulates, such as absorbent and/or adsorbent particulates, without increasing pressure drop across the fluid filtration system. Furthermore, some exemplary embodiments of the chemically active particulate-loaded nonwoven fibrous webs of the present disclosure may more effectively retain the particulates within the fiber nonwoven fibrous web without adversely decreasing the chemically active surface area of the particulates by occlusion with a binder material, thereby preventing release of particulates into the permeating fluid when used as fluid filtration articles, while facilitating interaction of the entire chemically active surface area with the permeating fluid, resulting in improved service life and greater filtration effectiveness.

In a further aspect, the disclosure describes an article including the nonwoven fibrous web of any one of the preceding embodiments, wherein the article is selected from a gas filtration article, a liquid filtration article, a surface cleaning article, a floor mat, an insulation article, a cellular growth support article, a drug delivery article, a personal hygiene article, and a wound dressing article.

In yet another aspect, the disclosure describes a method of making a nonwoven fibrous web of any of the preceding embodiments, including providing a forming chamber having an upper end and a lower end, introducing a multiplicity of fibers into the upper end of the forming chamber, transporting a population of the fibers to the lower end of the forming chamber as substantially discrete fibers, and capturing the population of substantially discrete fibers as a nonwoven fibrous web having an identifiable pattern on a patterned collector surface, wherein the identifiable pattern comprises a multiplicity of non-hollow projections extending from a major surface of the nonwoven fibrous web (as considered without the projections), and a multiplicity of substantially planar land areas formed between each adjoining projection in a plane defined by and substantially parallel with the major surface.

In some exemplary embodiments, the method further includes bonding at least a portion of the multiplicity of fibers together without the use of an adhesive prior to removal of the web from the patterned collector surface, thereby causing the fibrous web to retain the identifiable pattern. In certain exemplary embodiments, the method further includes introducing a multiplicity of particulates, which in some exemplary embodiments preferably may be chemically active particulates, into the forming chamber and mixing the multiplicity of discrete fibers with the multiplicity of particulates within the forming chamber to form a fibrous particulate mixture before capturing the population of substantially discrete fibers as a nonwoven fibrous web, and securing at least a portion of the particulates to the nonwoven fibrous web.

In further exemplary embodiments of any of the foregoing methods, the patterned collector surface includes a multiplicity of geometrically shaped perforations extending through the collector, and capturing the population of fibers includes drawing a vacuum through the perforated patterned collector surface. In certain exemplary embodiments, the multiplicity of geometrically shaped perforations have a shape selected from circular, oval, polygonal, X-shape, V-shape, helical, and combinations thereof. In some particular exemplary embodiments, the multiplicity of geometrically shaped perforations have a polygonal shape selected from triangular, square, rectangular, diamond, trapezoidal, pentagonal, hexagonal, octagonal, and combinations thereof. In some particular exemplary embodiments, the multiplicity of geometrically shaped perforations includes a two-dimensional pattern on the patterned collector surface. In other exemplary embodiments, the two-dimensional pattern of geometrically shaped perforations on the patterned collector surface is a two-dimensional array.

Various aspects and advantages of exemplary embodiments of the disclosure have been summarized. The above Summary is not intended to describe each illustrated embodiment or every implementation of the present invention. The Drawings and the Detailed Description that follow more particularly exemplify certain preferred embodiments using the principles disclosed herein.

BRIEF DESCRIPTION OF THE DRAWINGS

Exemplary embodiments of the present disclosure are further described with reference to the appended drawings, wherein:

FIG. 4 is a schematic enlarged and expanded view of an exemplary optional heat-treating part of the exemplary apparatus shown in FIG. 1.

Figure 1:
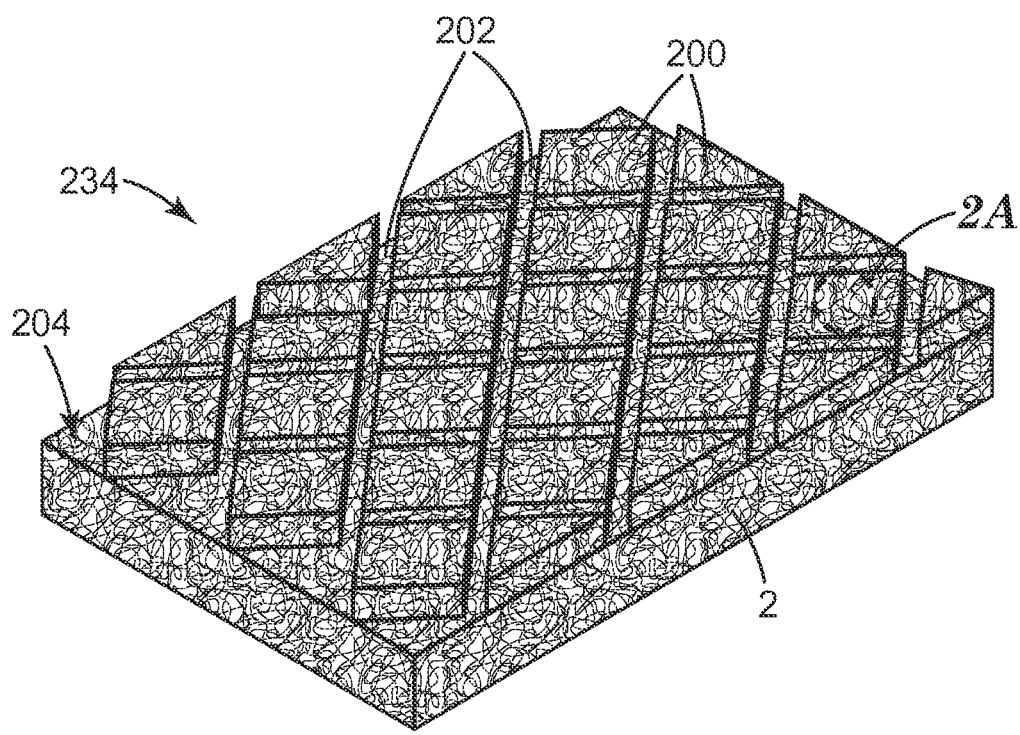
FIG. 1 is a perspective view of an exemplary patterned air-laid nonwoven fibrous web of the present disclosure.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this invention.

DETAILED DESCRIPTION

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

"Nonwoven fibrous web" means an article or sheet having a structure of individual fibers or fibers, which are interlaid, but not in an identifiable manner as in a knitted fabric. Nonwoven fabrics or webs have been formed from many processes such as for example, meltblowing processes, air-laying processes, and bonded carded web processes.

"Cohesive nonwoven fibrous web" means a fibrous web characterized by entanglement or bonding of the fibers sufficient to form a self-supporting web.

"Self-supporting" means a web having sufficient coherency and strength so as to be drapable and handleable without substantial tearing or rupture.

"Die" means a processing assembly for use in polymer melt processing and fiber extrusion processes, including but not limited to meltblowing and spun-bonding.

"Meltblowing" and "meltblown process" means a method for forming a nonwoven fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.).

"Meltblown fibers" means fibers prepared by a meltblowing or meltblown process.

"Spun-bonding" and "spun bond process" mean a method for forming a nonwoven fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 to Matsuki et al.

"Spun bond fibers" and "spun-bonded fibers" mean fibers made using spun-bonding or a spun bond process. Such fibers are generally continuous fibers and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 to Hogle et al., which describes fibers with unconventional shapes.

"Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. An exemplary carding process is taught in, for example, U.S. Pat. No. 5,114,787 to Chaplin et al.

"Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like.

"Autogenous bonding" means bonding between fibers at an elevated temperature as obtained in an oven or with a through-air bonder without application of solid contact pressure such as in point-bonding or calendering.

"Calendering" means a process of passing a nonwoven fibrous web through rollers with application of pressure to obtain a compressed and bonded fibrous nonwoven web. The rollers may optionally be heated.

"Densification" means a process whereby fibers which have been deposited either directly or indirectly onto a filter winding arbor or mandrel are compressed, either before or after the deposition, and made to form an area, generally or locally, of lower porosity, whether by design or as an artifact of some process of handling the forming or formed filter. Densification also includes the process of calendering webs.

"Void volume" means a percentage or fractional value for the unfilled space within a porous or fibrous body, such as a web or filter, which may be calculated by measuring the weight and volume of a web or filter, then comparing the weight to the theoretical weight of a solid mass of the same constituent material of that same volume.

"Porosity" means a measure of void spaces in a material. Size, frequency, number, and/or interconnectivity of pores and voids contribute the porosity of a material.

"Non-hollow" with particular reference to projections extending from a major surface of a nonwoven fibrous web means that the projections do not contain an internal cavity or void region other than the microscopic voids (i.e. void volume) between randomly oriented discrete fibers.

"Randomly oriented" with particular reference to a population of fibers means that the fiber bodies are not substantially aligned in a single direction.

"Air-laying" is a process by which a nonwoven fibrous web layer can be formed. In the air-laying process, bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 to Laursen et al.

"Wet-laying" is a process by which a nonwoven fibrous web layer can be formed. In the wet-laying process, bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g. hydro-entangled), or may be bonded to one another using, for example, thermal point bonding, autogenous bonding, hot air bonding, ultrasonic bonding, needle punching, calendering, application of a spray adhesive, and the like. An exemplary wet-laying and bonding process is taught in, for example, U.S. Pat. No. 5,167,765 to Nielsen et al. Exemplary bonding processes are also disclosed in, for example, U.S. Patent Application Publication No. 2008/0038976 A1 to Berrigan et al.

To "co-form" or a "co-forming process" means a process in which at least one fiber layer is formed substantially simultaneously with or in-line with formation of at least one different fiber layer. Webs produced by a co-forming process are generally referred to as "co-formed webs."

"Particulate loading" or a "particle loading process" means a process in which particulates are added to a fiber stream or web while it is forming. Exemplary particulate loading processes are taught in, for example, U.S. Pat. No. 4,818,464 to Lau and U.S. Pat. No. 4,100,324 to Anderson et al.

"Particulate" and "particle" are used substantially interchangeably. Generally, a particulate or particle means a small distinct piece or individual part of a material in finely divided form. However, a particulate may also include a collection of individual particles associated or clustered together in finely divided form. Thus, individual particulates used in certain exemplary embodiments of the present disclosure may clump, physically intermesh, electro-statically associate, or otherwise associate to form particulates. In certain instances, particulates in the form of agglomerates of individual particulates may be intentionally formed such as those described in U.S. Pat. No. 5,332,426 (Tang et al.).

"Particulate-loaded media" or "particulate-loaded nonwoven fibrous web" means a nonwoven web having an open-structured, entangled mass of discrete fibers, containing particulates enmeshed within or bonded to the fibers, the particulates being chemically active.

"Enmeshed" means that particulates are dispersed and physically held in the fibers of the web. Generally, there is point and line contact along the fibers and the particulates so that nearly the full surface area of the particulates is available for interaction with a fluid.

"Microfibers" means a population of fibers having a population median diameter of at least one micrometer (µm).

"Coarse microfibers" means a population of microfibers having a population median diameter of at least 10 µm.

"Fine microfibers" means a population of microfibers having a population median diameter of less than 10 µm.

"Ultrafine microfibers" means a population of microfibers having a population median diameter of 2 µm or less.

"Sub-micrometer fibers" means a population of fibers having a population median diameter of less than 1 µm.

"Continuous oriented microfibers" means essentially continuous fibers issuing from a die and traveling through a processing station in which the fibers are permanently drawn and at least portions of the polymer molecules within the fibers are permanently oriented into alignment with the longitudinal axis of the fibers ("oriented" as used with respect to a particular fiber means that at least portions of the polymer molecules of the fiber are aligned along the longitudinal axis of the fiber).

"Separately prepared microfibers" means a stream of microfibers produced from a microfiber-forming apparatus (e.g., a die) positioned such that the microfiber stream is initially spatially separate (e.g., over a distance of about 1 inch (25 mm) or more from, but will merge in flight and disperse into, a stream of larger size microfibers.

"Web basis weight" is calculated from the weight of a 10 cm×10 cm web sample, and is usually expressed in grams per square meter (gsm).

"Web thickness" is measured on a 10 cm×10 cm web sample using a thickness testing gauge having a tester foot with dimensions of 5 cm×12.5 cm at an applied pressure of 150 Pa.

"Bulk density" is the mass per unit volume of the bulk polymer or polymer blend that makes up the web, taken from the literature.

"Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., *The Separation of Airborne Dust and Particulates*, Institution of Mechanical Engineers, London Proceedings, 1B (1952).

"Molecularly same polymer" means polymers that have essentially the same repeating molecular unit, but which may differ in molecular weight, method of manufacture, commercial form, and the like.

"Layer" means a single stratum formed between two major surfaces. A layer may exist internally within a single web, e.g., a single stratum formed with multiple strata in a single web having first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

"Adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

"Particulate density gradient," "sorbent density gradient," and "fiber population density gradient" mean that the amount of particulate, sorbent or fibrous material within a particular fiber population (e.g., the number, weight or volume of a given material per unit volume over a defined area of the web) need not be uniform throughout the nonwoven fibrous web, and that it can vary to provide more material in certain areas of the web and less in other areas.

"Fluid treatment unit," "fluid filtration article," or "fluid filtration system" means an article containing a fluid filtration medium, such as a porous nonwoven fibrous web. These articles typically include a filter housing for a fluid filtration medium and an outlet to pass treated fluid away from the filter housing in an appropriate manner. The term "fluid filtration system" also includes any related method of separating raw fluid, such as untreated gas or liquid, from treated fluid.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

A. Patterned Air-Laid Nonwoven Fibrous Webs

The present disclosure, in some exemplary embodiments, describes a patterned air-laid nonwoven fibrous web including a population of air-laid discrete fibers captured in an identifiable pattern determined by a patterned collector surface and bonded together without the use of an adhesive prior to removal from the patterned collector surface. Patterned air-laid nonwoven fibrous webs having a two- or three-dimensional structured surface may be formed by capturing air-laid discrete fibers on a patterned collector surface and bonding the fibers without an adhesive while on the collector, for example, by thermally bonding the fibers on the collector under a through-air bonder.

Although non-patterned air-laid webs having a substantially flat or non-textured surface are known, for example, as described in U.S. Pat. No. 7,491,354 (Andersen) and U.S.

Pat. No. 6,808,664 (Falk et al.), conventional air-laid webs cannot achieve the patterned effect, nor retain any identifiable pattern formed on a collector surface, as the conventional air-laid fibers are generally not bonded into a structurally stable web until after removal from the collector surface and passing through a calendering operation.

FIG. 1 is a perspective view of one exemplary embodiment of a patterned air-laid nonwoven fibrous web 234 comprising a plurality of randomly oriented discrete fibers 2 according to the present disclosure. In some exemplary embodiments, the present disclosure describes a nonwoven fibrous web including a plurality of randomly oriented discrete fibers 2 defining a plurality of non-hollow projections 200 extending from a major surface 204 of the nonwoven fibrous web (as considered without the projections), and a plurality of substantially planar land areas 202 formed between each adjoining projection 200 in a plane defined by and substantially parallel with the major surface 204. It will be understood that while FIG. 1 illustrates projections 200 that have a cross-sectional geometrical shape in the direction substantially parallel to the major surface 204 of the patterned air-laid nonwoven fibrous web 234 that takes the form of a plurality of diamonds arranged in a regular array, the disclosure is not limited to this geometric shape or to a regular array of geometric shapes. As described further below, other geometric shapes (e.g. circular, oval, polygonal, x-shaped, v-shaped, cross-shaped, and the like) are within the scope of this disclosure, as are both regular array patterns and irregular arrangements of the plurality of projections 200.

The randomly oriented discrete fibers 2 may, in some embodiments, optionally include filling fibers. The filling fibers are any fiber other than a multi-component fiber. The optional filling fibers are preferably mono-component fibers, which may be thermoplastic or "melty" fibers. The optional filling fibers may, in some exemplary embodiments, comprise natural fibers, more preferably natural fibers derived from renewable sources, and/or incorporating recycled materials, as described further below.

Figure 2A:
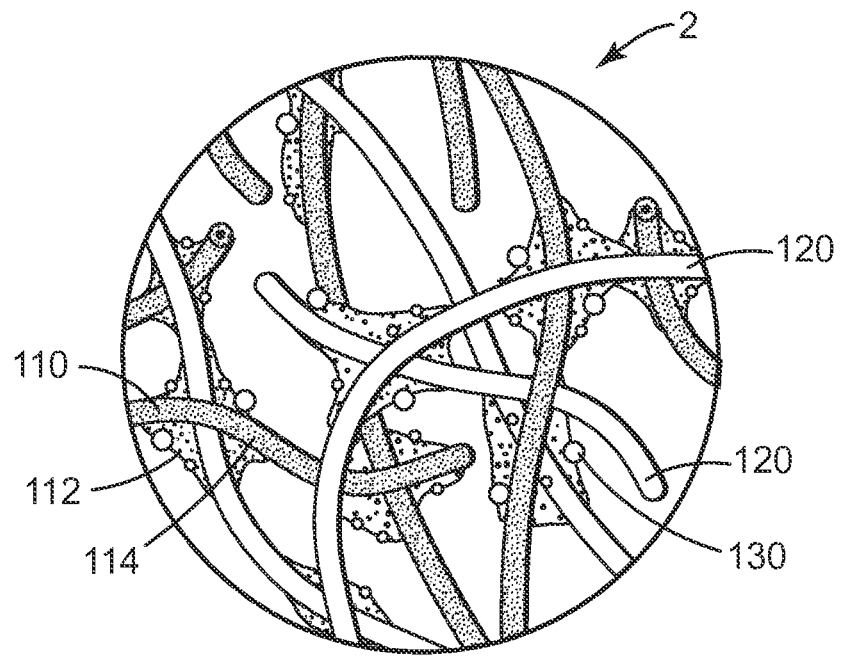
FIG. 2A is an exploded view of a portion of the exemplary patterned air-laid nonwoven fibrous web of FIG. 1, illustrating one exemplary embodiment of the present disclosure.
Figure 2B:
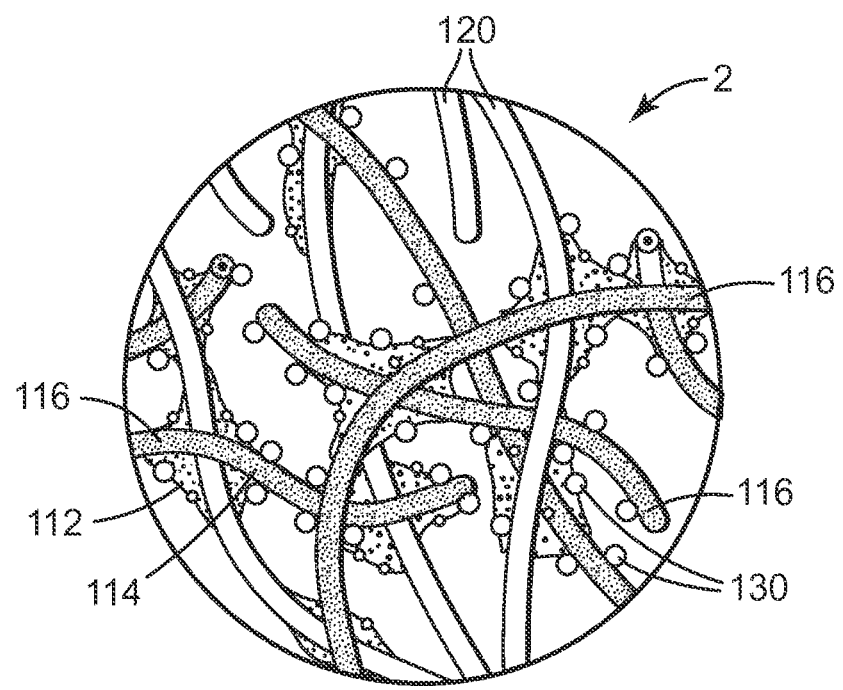
FIG. 2B is an exploded view of a portion of the exemplary patterned air-laid nonwoven fibrous web of FIG. 1, illustrating another exemplary embodiment of the present disclosure.

In some exemplary embodiments of the previously described patterned air-laid nonwoven fibrous webs, the patterned air-laid nonwoven fibrous webs 234 may optionally include a plurality of particulates 130 as shown in FIGS. 2A-2B. FIGS. 2A-2B illustrate exploded views of region 2A of the patterned air-laid nonwoven fibrous web 234 of FIG. 1, shown comprising randomly oriented discrete fibers 2 and a plurality of optional particulates 130.

Thus, in exemplary embodiments illustrated by FIG. 2A, the patterned air-laid nonwoven fibrous web 234 comprises a plurality of randomly oriented discrete fibers 2 and optionally a plurality of particulates 130 (which may be chemically active particulates), the randomly oriented discrete fibers comprising multi-component fibers 110 that include at least a first region 112 having a first melting temperature and a second region 114 having a second melting temperature, wherein the first melting temperature is less than the second melting temperature.

In some presently preferred exemplary embodiments, the multi-component fibers 110 are comprised in the fibrous web in an amount of at least 10% by weight of the total weight of the nonwoven fibrous web. In other exemplary embodiments, the multi-component fibers 110 comprise greater than 0% and less than 10% by weight (% wt.) of the total weight of the nonwoven fibrous web. Such embodiments are presently preferred for use with particulate-loaded patterned air-laid nonwoven fibrous webs, as described further below. In further exemplary embodiments, the multi-component fibers 110 comprise greater than 0% and less than 10% wt. of the total weight of discrete fibers. Such embodiments are presently preferred for use with chemically active particulate-loaded patterned air-laid nonwoven fibrous webs, as described further below Use of the multi-component fibers 110 allows for securing the discrete fibers 2 together along with the particulates 130 without the need of an additional adhesive or binder coating. In certain presently preferred embodiments, at least a portion of the particulates 130 are bonded to the at least first region 112 of at least a portion of the multi-component fibers 110, and at least a portion of the discrete fibers 2 are bonded together at a plurality of intersection points with the first region 112 of the multi-component fibers 110.

Optionally, the nonwoven article includes randomly oriented discrete fibers 2 that are filling fibers 120, that is, fibers that are not multi-component fibers, and which are preferably monocomponent fibers and/or natural fibers. In some presently preferred embodiments, at least some of the filling fibers 120 may be bonded to at least a portion of the discrete fibers 2 at a plurality of intersection points with the first region 112 of the multi-component fibers 110.

In another exemplary embodiment illustrated by the exploded view of FIG. 1 shown in FIG. 2B, the patterned air-laid nonwoven fibrous web 234 comprises a plurality of randomly oriented discrete fibers 2 and optionally a plurality of particulates 130 (which may be chemically active particulates), the randomly oriented discrete fibers 2 comprising a first population of monocomponent discrete thermoplastic fibers 116 having a first melting temperature, and a second population of monocomponent discrete fibers 120 having a second melting temperature greater than the first melting temperature. At least a portion of the particulates 130 is bonded to at least a portion of the first population of monocomponent discrete fibers 116, and at least a portion of the first population of monocomponent discrete fibers 116 is bonded to at least a portion of the second population of monocomponent discrete fibers 120.

In some exemplary embodiments of patterned air-laid nonwoven fibrous webs 234 including filling fibers, the particulates are preferably not substantially bonded to the filling fibers, and in certain exemplary embodiments, the filling fibers are not substantially bonded to each other.

In some presently preferred exemplary embodiments, the multi-component fibers 110 are comprised in the fibrous web in an amount of at least 10%, 20%, 30%, 40%, 50% or even 60% or more by weight of the total weight of the nonwoven fibrous web; and preferably no more than 100%, 90%, 80%, 70% or even 60% by weight of the total weight of the nonwoven fibrous web.

In other presently preferred exemplary embodiments, the first population of monocomponent discrete fibers 116 comprises greater than 0% and less than 10% wt., more preferably from 1-10% wt., 2-9% wt., 3-8% wt. of the total weight of the nonwoven fibrous web. In certain exemplary embodiments, the first population of monocomponent discrete fibers 116 comprises greater than 0% and less than 10% wt., more preferably from 1-10% wt., 2-9% wt., 3-8% wt. of the plurality of randomly oriented discrete fibers.

In certain exemplary embodiments, the first population of monocomponent discrete fibers 116 comprises a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

In any of the foregoing embodiments, the first melting temperature may be selected to be at least 50° C., more preferably at least 75° C., even more preferably at least 100° C., even more preferably at least 125° C., or even at least 150° C. In any of the foregoing embodiments, the second melting temperature may be selected to be at least 10° C., 20° C., 30° C., 40° C., or even 50° C. greater than the first melting temperature. In any of the foregoing embodiments, it is presently preferred that the first melting temperature be selected to be at least 100° C., and the second melting temperature may be selected to be at least 30° C. greater than the first melting temperature.

Various components of exemplary nonwoven fibrous webs according to the present disclosure will now be described.

B. Discrete Fibrous Components

Patterned air-laid nonwoven fibrous webs 234 of the present disclosure comprise one or more of the following discrete fiber components.

1. Multi-Component Fiber Component

In some embodiments illustrated by FIG. 2A, the patterned air-laid nonwoven fibrous web 234 comprises randomly oriented discrete fibers 2 which include multi-component fibers 110 having at least a first region 112 and a second region 114, where the first region 112 has a melting temperature lower than the second region 114. A variety of different types and configurations of multi-component fibers 110 exist. Suitable multi-component fibers 110 are described in, for example, U.S. Pat. No. 7,695,660 (Berrigan et al.); U.S. Pat. No. 6,057,256 (Krueger et al.); and U.S. Pat. Nos. 5,486,410, 5,662,728, and 5,972,808 (all Groeger et al.).

In certain exemplary embodiments, the multi-component fibers 110 are bicomponent fibers. One example of a suitable bicomponent fiber 110 is a sheath/core fiber, where the sheath that surrounds the core forms the first region 112 and the core forms the second region 114 of the fiber. The first region 112 may be comprised of such materials as copolyester or polyethylene. The second region 114 may be comprised of such materials as polypropylene or polyester. Suitable bicomponent fibers 110 are described in, for example, U.S. Pat. No. 4,552,603 (to Harris et al.).

During heating, the first region 112 will melt, while the second region 114 with a higher melting temperature remains intact. During melting, the first region 112 tends to collect at junction points where fibers contact one another. Then, upon cooling, the material of the first region 112 will resolidify to secure the web together. Therefore, it is a region of the multi-component fiber 110 that secures the fibers together to form the web 100. There is generally not a need for a separate binder to form the patterned air-laid nonwoven fibrous web 234.

By using the process disclosed below, it is possible to use the melted first region 112 of the multi-component fiber 110 to secure particulates 130 to the multi-component fiber 110, and therefore to the patterned air-laid nonwoven fibrous web 234. In general, the more multi-component fiber used in the patterned air-laid nonwoven fibrous web 234, the higher the possible loading of the particulates 130, as higher amounts of multi-component fibers 110 provide more available first region 112 for securing the particulates 130 to the patterned air-laid nonwoven fibrous web 234.

Surprisingly, however, we have discovered that by maintaining the quantity of multi-component fibers 110 so that they comprise greater than 0% and less than 10% wt. of the total weight of the patterned air-laid nonwoven fibrous web 234, preferably greater than 0% and less than 10% wt. of the total weight of the randomly oriented discrete fibers 2 used in the patterned air-laid nonwoven fibrous web 234, the particulates 130 may be adequately secured to the patterned air-laid nonwoven fibrous web 234 without occluding a substantial portion of the particulate 130 surface with melted material of first region 112. This may be particularly important for applications in which chemically active particulates are used, for example, gas and liquid filtration applications.

Thus, in some exemplary presently-preferred embodiments, not more than 9%, 8%, 7%, 6%, 5%, 4%, or 3% wt. of the plurality of randomly oriented discrete fibers 2 in the patterned air-laid nonwoven fibrous web 234 comprise multi-component fibers 110.

Preferred multi-component fibers 110 comprise synthetic polymers. Preferred synthetic polymers may be copolymers or even terpolymers. Preferred polymers and copolymer components may be selected from polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

Preferred multi-component fibers 110 may include a core and a sheath structure. One suitable class of commercially-available core and sheath multi-component polymer is available under the trade name Celbond® (available from KoSa Co. of Wichita, Kans.), for example, Celbond® 254 fiber wherein the sheath has a melting temperature of 110° C. Other commercially available multi-component polymeric fibers are within the scope of the present disclosure.

Other multi-component fibers 110 may consist of a layered structure where one layer has a first melting temperature and another layer has a second melting temperature lower than the first melting temperature. In such an arrangement, the layer with the second melting temperature will melt and resolidify to secure the web together.

Typically, the multi-component fibers 110 are at least 0.25 inch (0.635 cm) long and have a denier of at least 1. Preferably, the multi-component fibers 110 are at least 0.5 inches (1.27 cm) long and have a denier of at least 2. However, it is to be understood that the fibers can be as small as the shortest length of fiber that can be cut from a fiber, or as long as can be conveniently handled.

2. Monocomponent Fiber Component

In some exemplary embodiments illustrated by FIG. 2B, the patterned air-laid nonwoven fibrous web 234 comprises a plurality of randomly oriented discrete fibers 2 including a first population of monocomponent discrete thermoplastic fibers 116 having a first melting temperature, and a second population of monocomponent discrete filling fibers 120 having a second melting temperature greater than the first melting temperature. In some exemplary embodiments, the first population of monocomponent discrete thermoplastic fibers 116 comprises greater than 0% and less than 10% wt. of the total weight of the patterned air-laid nonwoven fibrous web 234.

Surprisingly, however, we have discovered that by maintaining the quantity of monocomponent discrete thermoplastic fibers 116 so that they comprise greater than 0% and less than 10% by weight of the total weight of randomly oriented discrete fibers 2 used in the patterned air-laid nonwoven fibrous web 234, the particulates 130 may be adequately secured to the patterned air-laid nonwoven fibrous web 234 without occluding a substantial portion of the particulate 130 surface with melted material of first region 112. This may be particularly important for applications in which chemically active particulates are used, for example, gas and liquid filtration applications.

Thus, in some exemplary presently-preferred embodiments, not more than 9%, 8%, 7%, 6%, 5%, 4% or 3% wt. of the plurality of randomly oriented discrete fibers 2 in the patterned air-laid nonwoven fibrous web 234 comprise monocomponent discrete thermoplastic fibers 116.

In certain exemplary embodiments, the monocomponent discrete thermoplastic fibers 116 or monocomponent discrete filling fibers 120 comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof. In certain exemplary embodiments, monocomponent discrete filler fibers 120 that are non-thermoplastic or which do not exhibit a melting or softening point, may be blended together.

3. Filling Fiber Component

In further exemplary embodiments, the patterned air-laid nonwoven fibrous web 234 may additionally or alternatively comprise randomly oriented discrete fibers 2 that are filling fibers 120, that is, fibers that are not multi-component fibers.

Non-limiting examples of suitable filling fibers 120 include single component synthetic fibers, semi-synthetic fibers, polymeric fibers, metal fibers, carbon fibers, ceramic fibers, and natural fibers. Synthetic and/or semi-synthetic polymeric fibers include those made of polyester (e.g., polyethylene terephthalate), nylon (e.g., hexamethylene adipamide, polycaprolactam), polypropylene, acrylic (formed from a polymer of acrylonitrile), rayon, cellulose acetate, polyvinylidene chloride-vinyl chloride copolymers, vinyl chloride-acrylonitrile copolymers, and the like.

Non-limiting examples of suitable metal fibers include fibers made from any metal or metal alloy, for example, iron, titanium, tungsten, platinum, copper, nickel, cobalt, and the like.

Non-limiting examples of suitable carbon fibers include graphite fibers, activated carbon fibers, poly(acrylonitrile)-derived carbon fibers, and the like.

Non-limiting examples of suitable ceramic fibers include any metal oxide, metal carbide, or metal nitride, including but not limited to silicon oxide, aluminum oxide, zirconium oxide, silicon carbide, tungsten carbide, silicon nitride, and the like.

Non-limiting examples of suitable natural fibers include those of cotton, wool, jute, agave, sisal, coconut, soybean, hemp, and the like. The fiber component used may be virgin fibers or recycled waste fibers, for example, recycled fibers reclaimed from garment cuttings, carpet manufacturing, fiber manufacturing, textile processing, or the like.

The size and amount of filling fibers 120, if included, used to form the patterned air-laid nonwoven fibrous web 234 will depend on the desired properties (i.e., loftiness, openness, softness, drapability) of the patterned air-laid nonwoven fibrous web 234 and the desired loading of the particulate. Generally, the larger the fiber diameter, the larger the fiber length, and the presence of a crimp in the fibers will result in a more open and lofty nonwoven article. Generally, small and shorter fibers will result in a more compact nonwoven article.

Flexible, drapable and compact nonwoven fibrous webs may be preferred for certain applications, for examples as furnace filters or gas filtration respirators. Such nonwoven fibrous webs typically have a density greater than 75 kg/m$^3$ and typically greater than 100 kg/m$^3$ or even 120 100 kg/m$^3$. However, open, lofty nonwoven fibrous webs suitable for use in certain fluid filtration applications generally have a maximum density of 60 kg/m$^3$. Certain nonwoven fibrous webs according to the present disclosure may have Solidity less than 20%, more preferably less than 15%, even more preferable less than 10%.

C. Optional Particulate Component

As noted above, exemplary patterned air-laid nonwoven fibrous webs 234 according to the present disclosure may optionally include a plurality of particulates. The particulates 130 can be any discrete particulate which is a solid at room temperature. In certain exemplary embodiments, the plurality of particulates includes benefiting particulates selected from abrasive particulates, metal particulates, detergent particulates, surfactant particulates, biocide particulates, adsorbent particulates, absorbent particulates, microcapsules, and combinations thereof.

In some exemplary embodiments, the benefiting particles 130 are abrasive particles. Abrasive particles are used to create an abrasive nonwoven article 100 that can scour and abrade difficult to remove material during cleaning. Abrasive particles may be mineral particles, synthetic particles, natural abrasive particles or a combination thereof. Examples of mineral particles include aluminum oxide such as ceramic aluminum oxide, heat-treated aluminum oxide and white-fused aluminum oxide; as well as silicon carbide, alumina zirconia, diamond, ceria, cubic boron nitride, garnet, flint, silica, pumice, and calcium carbonate. Synthetic particles include polymeric materials such as polyester, polyvinylchloride, methacrylate, methylmethacrylate, polycarbonate, melamine, and polystyrene. Natural abrasive particles include nutshells such as walnut shell, or fruit seeds such as apricot, peach, and avocado seeds.

Various sizes, hardness, and amounts of abrasive particles may be used to create an abrasive nonwoven article 100 ranging from very strong abrasiveness to very light abrasiveness. In one embodiment, the abrasive particles have a size greater than 1 mm in diameter. In another embodiment, the abrasive particles have a size less than 1 cm in diameter. In one embodiment, a combination of particles sizes and hardness can be used to give a combination of abrasiveness that is strong without scratching. In one embodiment, the abrasive particles include a mixture of soft particles and hard particles.

In other exemplary embodiments, the benefiting particles 130 are metal. The metal particles may be used to create a polishing nonwoven article 100. The metal particles may be in the form of short fiber or ribbon-like sections or may be in the form of grain-like particles. The metal particles can include any type of metal such as but not limited to steel, stainless steel, copper, brass, gold, silver (which has antibacterial/antimicrobial properties), platinum, bronze or blends of one or more of various metals.

In certain exemplary embodiments, the benefiting particles 130 are solid materials typically found in detergent compositions, such as surfactants and bleaching agents. Examples of solid surfactants include sodium lauryl sulfate and dodecyl benzene sulfonate.

Other examples of solid surfactants can be found in "2008 McCutcheon's Volume I: Emulsifiers and Detergents (North American Edition)" published by McCutcheon's Division. Examples of solid bleaching agents include inorganic perhydrate salts such as sodium perborate mono- and tetrahydrates and sodium percarbonate, organic peroxyacids derivatives and calcium hypochlorite.

In further exemplary embodiments, the benefiting particles 130 are solid biocides or antimicrobial agents. Examples of solid biocide and antimicrobial agents include halogen containing compounds such as sodium dichloroisocyanurate dihydrate, benzylkoniumchloride, halogenated dialkylhydantoins, and triclosan.

In additional exemplary embodiments, the benefiting particles 130 are microcapsules. Microcapsules are described in U.S. Pat. No. 3,516,941 to Matson and include examples of the microcapsules that can be used as the benefiting particles 130. The microcapsules may be loaded with solid or liquid fragrance, perfume, oil, surfactant, detergent, biocide, or antimicrobial agents. One of the main qualities of a microcapsule is that by means of mechanical stress the particles can be broken in order to release the material contained within them. Therefore, during use of the nonwoven article 100, the microcapsules will be broken due to the pressure exerted on the nonwoven article 100, which will release the material contained within the microcapsule.

In some particular exemplary embodiments, the benefiting particles 130 are adsorbent or absorbent particles. For example, adsorbent particles could include activated carbon, charcoal, sodium bicarbonate. For example, absorbent particle could include porous material, natural or synthetic foams such as melamine, rubber, urethane, polyester, polyethylene, silicones, and cellulose. The absorbent particle could also include superabsorbent particles such as sodium polyacrylates, carboxymethyl cellulose, or granular polyvinyl alcohol. The adsorbent or absorbent particles may have a size greater than 1 mm in diameter in one embodiment. In another embodiment, the adsorbent or absorbent particle may have a size less and 1 cm in diameter. In one embodiment, at least 50% wt. of the entire nonwoven article is an absorbent foam. In another embodiment, at least 75% wt. of the entire nonwoven article is an absorbent foam. In another embodiment, at least 90% wt. of the entire nonwoven article is an absorbent foam.

In certain exemplary embodiments, the benefiting particle is a chopped cellulose sponge. In such an embodiment, at least 75% wt. of the entire nonwoven article is the chopped cellulose sponge. It has been found that a nonwoven article with cellulose sponge benefiting particles is a highly hydrophilic, absorbent article. In addition, a nonwoven article with cellulose sponge benefiting particles remains flexible and drapable even following drying. Typically, cellulose sponge products become rigid and less flexible upon drying.

In some exemplary embodiments presently preferred for gas or liquid filtration applications, the benefiting particulates include chemically active particulates, which are capable of undergoing a chemical interaction with an external fluid phase. Exemplary chemical interactions include adsorption, absorption, chemical reaction, catalysis of a chemical reaction, dissolution, and the like. The chemically active particulates may, in some exemplary embodiments, be selected from activated carbon particulates, activated alumina particulates, silica gel particulates, desiccant particulates, anion exchange resin particulates, cation exchange resin particulates, molecular sieve particulates, diatomaceous earth particulates, anti-microbial compound particulates, and combinations thereof. In some particular exemplary embodiments, the chemically active particulates are distributed substantially throughout an entire thickness of the nonwoven fibrous web. In other particular exemplary embodiments, the chemically active particulates are distributed substantially on a surface of the plurality of non-hollow projections.

In one exemplary embodiment of a patterned air-laid nonwoven fibrous web 234 particularly useful as a fluid filtration article, the particulates 130 are sorbent particulates. A variety of sorbent particulates can be employed. Sorbent particulates include mineral particulates, synthetic particulates, natural sorbent particulates or a combination thereof. Desirably the sorbent particulates will be capable of absorbing or adsorbing gases, aerosols, or liquids expected to be present under the intended use conditions.

The sorbent particulates can be in any usable form including beads, flakes, granules or agglomerates. Preferred sorbent particulates include activated carbon; silica gel; activated alumina and other metal oxides; metal particulates (e.g., silver particulates) that can remove a component from a fluid by adsorption or chemical reaction; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; biocides; fungicides and virucides. Activated carbon and activated alumina are presently particularly preferred sorbent particulates. Mixtures of sorbent particulates can also be employed, e.g., to absorb mixtures of gases, although in practice to deal with mixtures of gases it may be better to fabricate a multilayer sheet article employing separate sorbent particulates in the individual layers.

In one exemplary embodiment of a patterned air-laid nonwoven fibrous web 234 particularly useful as a gas filtration article, the chemically active sorbent particulates 130 are selected to be gas adsorbent or absorbent particulates. For example, gas adsorbent particulates may include activated carbon, charcoal, zeolites, molecular sieves, desiccants, an acid gas adsorbent, an arsenic reduction material, an iodinated resin, and the like. For example, absorbent particulates may also include naturally porous particulate materials such as diatomaceous earth, clays, or synthetic particulate foams such as melamine, rubber, urethane, polyester, polyethylene, silicones, and cellulose. The absorbent particulates may also include superabsorbent particulates such as sodium polyacrylates, carboxymethyl cellulose, or granular polyvinyl alcohol.

In certain presently preferred embodiments of a nonwoven fibrous web particularly useful as a liquid filtration article, the sorbent particulates comprise liquid an activated carbon, diatomaceous earth, an ion exchange resin (e.g. an anion exchange resin, a cation exchange resin, or combinations thereof), a molecular sieve, a metal ion exchange sorbent, an activated alumina, an antimicrobial compound, or combinations thereof. Certain presently preferred embodiments provide that the web has a sorbent particulate density in the range of about 0.20 to about 0.5 g/cc.

Various sizes and amounts of sorbent particulates 130 may be used to create a patterned air-laid nonwoven fibrous web 234. In one exemplary embodiment, the sorbent particulates have a median size greater than 1 mm in diameter. In another exemplary embodiment, the sorbent particulates have a median size less than 1 cm in diameter. In one embodiment, a combination of particulate sizes can be used. In one exemplary embodiment, the sorbent particulates include a mixture of large particulates and small particulates.

The desired sorbent particulate size can vary a great deal and usually will be chosen based in part on the intended service conditions. As a general guide, sorbent particulates particularly useful for fluid filtration applications may vary in size from about 0.001 to about 3000 µm median diameter. Preferably the sorbent particulates are from about 0.01 to about 1500 µm median diameter, more preferably from about 0.02 to about 750 µm median diameter, and most preferably from about 0.05 to about 300 µm median diameter.

In certain exemplary embodiments, the sorbent particulates may comprise nanoparticulates having a population median diameter less than 1 µm. Porous nanoparticulates may have the advantage of providing high surface area for sorption of contaminants from a fluid medium (e.g., absorption and/or adsorption). In such exemplary embodiments using ultrafine or nanoparticulates, it is preferred that the particulates are adhesively bonded to the fibers using an adhesive, for example a hot melt adhesive, and/or the application of heat to one or both of thermoplastic particulates or thermoplastic fibers (i.e., thermal bonding).

Mixtures (e.g., bimodal mixtures) of sorbent particulates having different size ranges can also be employed, although in practice it may be better to fabricate a multilayer sheet article employing larger sorbent particulates in an upstream layer and smaller sorbent particulates in a downstream layer. At least 80 weight percent sorbent particulates, more preferably at least 84 weight percent and most preferably at least 90 weight percent sorbent particulates are enmeshed in the web. Expressed in terms of the web basis weight, the sorbent particulate loading level may for example be at least about 500 gsm for relatively fine (e.g. sub-micrometer-sized) sorbent particulates, and at least about 2,000 gsm for relatively coarse (e.g., micro-sized) sorbent particulates.

In some exemplary embodiments, the particulates 130 are metal particulates. The metal particulates may be used to create a polishing patterned air-laid nonwoven fibrous web 234. The metal particulates may be in the form of short fiber or ribbon-like sections or may be in the form of grain-like particulates. The metal particulates can include any type of metal such as but not limited to silver (which has antibacterial/antimicrobial properties), copper (which has properties of an algaecide), or blends of one or more of chemically active metals.

In other exemplary embodiments, the particulates 130 are solid biocides or antimicrobial agents. Examples of solid biocide and antimicrobial agents include halogen containing compounds such as sodium dichloroisocyanurate dihydrate, benzylkoniumchloride, halogenated dialkylhydantoins, and triclosan.

In further exemplary embodiments, the particulates 130 are microcapsules. Microcapsules are described in U.S. Pat. No. 3,516,941 (Matson), and include examples of the microcapsules that can be used as the particulates 130. The microcapsules may be loaded with solid or liquid biocides or antimicrobial agents. One of the main qualities of a microcapsule is that by means of mechanical stress the particulates can be broken in order to release the material contained within them. Therefore, during use of the patterned air-laid nonwoven fibrous web 234, the microcapsules will be broken due to the pressure exerted on the patterned air-laid nonwoven fibrous web 234, which will release the material contained within the microcapsule.

In certain such exemplary embodiments, it may be advantageous to use at least one particulate that has a surface that can be made adhesive or "sticky" so as to bond together the particulates to form a mesh or support nonwoven fibrous web for the fiber component. In this regard, useful particulates may comprise a polymer, for example, a thermoplastic polymer, which may be in the form of discontinuous fibers. Suitable polymers include polyolefins, particularly thermoplastic elastomers (TPE's) (e.g., VISTAMAXX™, available from Exxon-Mobil Chemical Company, Houston, Tex.). In further exemplary embodiments, particulates comprising a TPE, particularly as a surface layer or surface coating, may be preferred, as TPE's are generally somewhat tacky, which may assist bonding together of the particulates to form a three-dimensional network before addition of the fibers to form the nonwoven fibrous web. In certain exemplary embodiments, particulates comprising a VISTAMAXX™ TPE may offer improved resistance to harsh chemical environments, particularly at low pH (e.g., pH no greater than about 3) and high pH (e.g., pH of at least about 9) and in organic solvents.

Any suitable size or shape of particulate material may be selected. Suitable particulates may have a variety of physical forms (e.g., solid particulates, porous particulates, hollow bubbles, agglomerates, discontinuous fibers, staple fibers, flakes, and the like); shapes (e.g., spherical, elliptical, polygonal, needle-like, and the like); shape uniformities (e.g., monodisperse, substantially uniform, non-uniform or irregular, and the like); composition (e.g. inorganic particulates, organic particulates, or combination thereof); and size (e.g., sub-micrometer-sized, micro-sized, and the like).

With particular reference to particulate size, in some exemplary embodiments, it may be desirable to control the size of a population of the particulates. In certain exemplary embodiments, particulates are physically entrained or trapped in the fiber nonwoven fibrous web. In such embodiments, the population of particulates is preferably selected to have a median diameter of at least 50 µm, more preferably at least 75 µm, still more preferably at least 100 µm.

In other exemplary embodiments, it is preferred to use finer particulates that are adhesively bonded to the fibers using an adhesive, for example a hot melt adhesive, and/or the application of heat to one or both of thermoplastic particulates or thermoplastic fibers (i.e., thermal bonding). In such embodiments, it is generally preferred that the particulates have a median diameter of at least 25 µm, more preferably at least 30 µm, most preferably at least 40 µm. In some exemplary embodiments, the particulates have a median size less than 1 cm in diameter. In other embodiments, the particulates have a median size of less than 1 mm, more preferably less than 25 micrometers, even more preferably less than 10 micrometers.

However, in other exemplary embodiments in which both an adhesive and thermal bonding are used to adhere the particulates to the fibers, the particulates may comprise a population of sub-micrometer-sized particulates having a population median diameter of less than one micrometer (µm), more preferably less than about 0.9 µm, even more preferably less than about 0.5 µm, most preferably less than about 0.25 µm. Such sub-micrometer-sized particulates may be particularly useful in applications where high surface area and/or high absorbency and/or adsorbent capacity is desired. In further exemplary embodiments, the population of sub-micrometer-sized particulates has a population median diameter of at least 0.001 µm, more preferably at least about 0.01 µm, most preferably at least about 0.1 µm, most preferably at least about 0.2 µm.

In further exemplary embodiments, the particulates comprise a population of micro-sized particulates having a population median diameter of at most about 2,000 µm, more preferably at most about 1,000 µm, most preferably at most about 500 µm. In other exemplary embodiments, the particulates comprise a population of micro-sized particulates having a population median diameter of at most about 10 µm, more preferably at most about 5 µm, even more preferably at most about 2 µm (e.g., ultrafine microfibers).

Multiple types of particulates may also be used within a single finished web. Using multiple types of particulates, it may be possible to generate continuous particulate webs even if one of the particulate types does not bond with other particulates of the same type. An example of this type of system would be one where two types are particulates are used, one that bonds the particulates together (e.g., a discontinuous polymeric fiber particulate) and another that acts as an active particulate for the desired purpose of the web (e.g., a sorbent particulate such as activated carbon). Such exemplary embodiments may be particularly useful for fluid filtration applications.

Depending, for example, on the density of the particulate, size of the particulate, and/or desired attributes of the final nonwoven fibrous web article, a variety of different loadings of the particulates may be used relative to the total weight of the fibrous web. In one embodiment, the particulates comprise less than 90% wt. of the total nonwoven article weight. In one embodiment, the particulates comprise at least 10% wt. of the total nonwoven article weight.

In any of the foregoing embodiments, the particulates may be advantageously distributed throughout the entire thickness of the nonwoven fibrous web. However, in some of the foregoing embodiments, the particulates are preferentially distributed substantially on a major surface of the nonwoven fibrous web.

Furthermore, it is to be understood that any combination of one or more of the above described particulates 130 may be used to form patterned air-laid nonwoven fibrous webs 234 according to the present disclosure.

D. Optional Binder Component

In any of the foregoing exemplary embodiments, the nonwoven fibrous web is preferably substantially free of any additional binder. However, in some of the foregoing embodiments, the nonwoven fibrous web further comprises a binder coating covering at least a portion of the plurality of randomly oriented discrete fibers. In some exemplary embodiments, the binder may be a liquid or a solid powder. In certain presently preferred exemplary embodiments, the binder does not substantially occlude the surface of the particulates.

Although it is the first region 112 of the multi-component fiber 110 that secures the fibers 110, 120 and the particulate 130 together, an optional binder material or coating may be included during or following the formation of the patterned air-laid nonwoven fibrous web 234. This optional binder coating may provide further strength to the nonwoven article, may further secure the particulates to the fibers, and/or may provide additional stiffness for an abrasive or scouring article.

The optional binder coating may be applied by known processing means such as roll coating, spray coating, and immersion coating and combinations of these coating techniques. The binder coating may include additional particulate 130 within the binder or additional particulates 130 may be incorporated and secured to the binder.

The optional binder may be a resin. Suitable resins include phenolic resins, polyurethane resins, polyureas, styrene-butadiene rubbers, nitrile rubbers, epoxies, acrylics, and polyisoprene. The binder may be water soluble. Examples of water soluble binders include surfactants, polyethylene glycol, polyvinylpyrrolidones, polylactic acid (PLA), polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

E. Optional Additional Layers

The patterned air-laid fibrous webs of the present disclosure may comprise additional layers. The one or more additional layers may be present over and/or under an outer surface of the air-laid fiber web.

Suitable additional layers include, but are not limited to, a color-containing layer (e.g., a print layer); any of the above-described support layers; one or more additional sub-micrometer fiber components having a distinct average fiber diameter and/or physical composition; one or more secondary fine sub-micrometer fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof.

Exemplary nonwoven fibrous webs of the present disclosure may optionally comprise at least one additional layer of sub-micrometer fibers, fine fibers, microfibers or coarse fiber components, such as coarse microfibers. The at least one layer of fibers may be an underlayer, support layer or collector for the patterned air-laid nonwoven fibrous web 234, or may be an overlayer or cover layer. The at least one fiber layer may be co-formed with the patterned air-laid nonwoven fibrous web 234, or may be pre-formed as a web roll before forming the patterned air-laid nonwoven fibrous web 234, and unrolled to provide a collector or cover layer for the patterned air-laid nonwoven fibrous web 234, or may be post-formed after forming the patterned air-laid nonwoven fibrous web 234, and applied adjoining the patterned air-laid nonwoven fibrous web 234.

1. Optional Support Layer

The nonwoven fibrous webs of the present disclosure may further comprise an optional support layer. In certain presently preferred embodiments, the optional support layer is porous. When present, the optional support layer may provide most of the strength of the composite nonwoven fibrous article. In some embodiments, the above-described sub-micrometer fiber component tends to have very low strength, and can be damaged during normal handling. Attachment of the sub-micrometer fiber component to a support layer lends strength to the sub-micrometer fiber component, while retaining high porosity, and hence the desired absorbent properties of the sub-micrometer fiber component. A multi-layer nonwoven fibrous web structure may also provide sufficient strength for further processing, which may include, but is not limited to, winding the web into roll form, removing the web from a roll, molding, pleating, folding, stapling, weaving, and the like.

A variety of support layers may be used in the present disclosure. Suitable support layers include, but are not limited to, a nonwoven fabric, a woven fabric, a knitted fabric, a foam layer, a film, a paper layer, an adhesive-backed layer, a foil, a mesh, an elastic fabric (i.e., any of the above-described woven, knitted or nonwoven fabrics having elastic properties), a web with an aperture, an adhesive-backed layer, or any combination thereof. In one exemplary embodiment, the porous support layer comprises a polymeric nonwoven fabric. Suitable nonwoven polymeric fabrics include, but are not limited to, a air-laided fabric, a meltblown fabric, a carded web of staple length fibers (i.e., fibers having a fiber length of less than about 100 mm), a needle-punched fabric, a split film web, a wet-laid hydroentangled web, an air-laid staple fiber web, or a combination thereof. In certain exemplary embodiments, the support layer comprises a web of bonded staple fibers. As described further below, bonding may be effected using, for example, thermal bonding, adhesive bonding, powdered binder bonding, hydroentangling, needlepunching, calendering, or a combination thereof.

The support layer may have a basis weight and thickness depending upon the particular end use of the composite nonwoven fibrous article. In some embodiments of the present disclosure, it is desirable for the overall basis weight and/or thickness of the composite nonwoven fibrous article to be kept at a minimum level. In other embodiments, an overall minimum basis weight and/or thickness may be required for a given application. Typically, the support layer has a basis weight of less than about 150 gsm. In some embodiments, the support layer has a basis weight of from about 5.0 gsm to about 100 gsm. In other embodiments, the support layer has a basis weight of from about 10 gsm to about 75 gsm.

As with the basis weight, the support layer may have a thickness, which varies depending upon the particular end use of the composite nonwoven fibrous article. Typically, the support layer has a thickness of less than about 150 millimeters (mm), more preferably less than 100 mm, most preferably less than 50 mm. In certain embodiments, the support layer has a thickness of at least about 0.1 mm, more preferably at least 0.5 mm, most preferably at least 1.0 mm. In some embodiments, the support layer has a thickness of from about 1.0 mm to about 35 mm. In other embodiments, the support layer has a thickness of from about 2.0 mm to about 25 mm.

In certain exemplary embodiments, the support layer may comprise a microfiber component, for example, a population of microfibers, as described further below.

2. Optional Cover Layer

In some exemplary embodiments, patterned air-laid nonwoven fibrous webs 234 of the present disclosure may further comprise an optional cover layer adjoining the patterned air-laid nonwoven fibrous web 234. In certain exemplary embodiments, the optional cover layer is porous. In some exemplary embodiments, the optional cover layer comprises sub-micrometer fibers. In certain presently preferred embodiments, the nonwoven fibrous web comprises both a collector and a cover layer.

a. Microfibers

In some exemplary embodiments, a preferred microfiber or coarse fiber component comprises a population of microfibers having a population median fiber diameter of at least 1 μm. In other exemplary embodiments, a preferred coarse fiber component comprises a population of microfibers (more preferably polymeric microfibers) having a population median fiber diameter of at least 10 μm. In certain other exemplary embodiments, the microfiber component comprises a fiber population having a population median fiber diameter ranging from about 2 μm to about 100 μm. In further exemplary embodiments, the microfiber component comprises a fiber population having a median fiber diameter ranging from about 5 μm to about 50 μm.

In the present disclosure, the "median fiber diameter" of fibers in a given microfiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 2. However, in some cases, x may be selected to be as low as 30 or even 20. These lower values of x may be particularly useful for large diameter fibers, or for highly entangled fibers.

In some exemplary embodiments, the microfiber component may comprise one or more polymeric materials. Generally, any fiber-forming polymeric material may be used in preparing the microfiber, though usually and preferably the fiber-forming material is semi-crystalline. The polymers commonly used in fiber formation, such as polyethylene, polypropylene, polyethylene terephthalate, nylon, and urethanes, are especially useful. Webs have also been prepared from amorphous polymers such as polystyrene. The specific polymers listed here are examples only, and a wide variety of other polymeric or fiber-forming materials are useful.

Suitable polymeric materials include, but are not limited to, polyolefins such as polybutylene, polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

A variety of synthetic fiber-forming polymeric materials may be employed, including thermoplastics and especially extensible thermoplastics such as linear low density polyethylenes (e.g., those available under the trade designation DOWLEX™ from Dow Chemical Company, Midland, Mich.), thermoplastic polyolefinic elastomers (TPE's), for example, those available under the trade designations ENGAGE™ (from Dow Chemical Company, Midland, Mich.), and VISTAMAXX™ from Exxon-Mobil Chemical Company, Houston, Tex.), ethylene alpha-olefin copolymers (e.g., the ethylene butene, ethylene hexene or ethylene octene copolymers available under the trade designations EXACT™ from Exxon-Mobil Chemical Company, Houston, Tex.; and ENGAGE™ from Dow Chemical Company, Midland, Mich.), ethylene vinyl acetate polymers (e.g., those available under the trade designations ELVAX™ from E. I. DuPont de Nemours & Co., Wilmington, Del.), polybutylene elastomers (e.g., those available under the trade designations CRASTIN™ from E. I. DuPont de Nemours & Co., Wilmington, Del.; and POLYBUTENE-1™ from Basell Polyolefins, Wilmington, Del.), elastomeric styrenic block copolymers (e.g., those available under the trade designations KRATON™ from Kraton Polymers, Houston, Tex.; and SOLPRENE™ from Dynasol Elastomers, Houston, Tex.) and polyether block copolyamide elastomeric materials (e.g., those available under the trade designation PEBAX™ from Arkema, Colombes, France). Thermoplastic Polyolefinic Elastomers (TPE's) are especially preferred.

A variety of natural fiber-forming materials may also be made into nonwoven microfibers according to exemplary embodiments of the present disclosure. Preferred natural materials may include bitumen or pitch (e.g., for making carbon fibers). The fiber-forming material can be in molten form or carried in a suitable solvent. Reactive monomers can also be employed, and reacted with one another as they pass to or through the die. The nonwoven webs may contain a mixture of fibers in a single layer (made for example, using two closely spaced die cavities sharing a common die tip), a plurality of layers (made for example, using a plurality of die cavities arranged in a stack), or one or more layers of multi-component fibers (such as those described in U.S. Pat. No. 6,057,256 (Krueger et al.).

Fibers also may be formed from blends of materials, including materials into which certain additives have been blended, such as pigments or dyes. Bicomponent microfibers, such as core-sheath or side-by-side bicomponent fibers, may be prepared ("bicomponent" herein includes fibers with two or more components, each component occupying a part of the cross-sectional area of the fiber and extending over a substantial length of the fiber), as may be bicomponent sub-micrometer fibers. However, exemplary embodiments of the disclosure may be particularly useful and advantageous with monocomponent fibers (in which the fibers have essentially the same composition across their cross-section, but "monocomponent" includes blends or additive-containing materials, in which a continuous phase of substantially uniform composition extends across the cross-section and over the length of the fiber). Among other benefits, the ability to use single-component fibers reduces complexity of manufacturing and places fewer limitations on use of the web.

In addition to the fiber-forming materials mentioned above, various additives may be added to the fiber melt and extruded to incorporate the additive into the fiber. Typically, the amount of additives is less than about 25 weight percent, desirably, up to about 5.0 weight percent, based on a total weight of the fiber. Suitable additives include, but are not limited to, particulates, fillers, stabilizers, plasticizers, tackifiers, flow control agents, cure rate retarders, adhesion promoters (for example, silanes and titanates), adjuvants, impact modifiers, expandable microspheres, thermally conductive particulates, electrically conductive particulates, silica, glass, clay, talc, pigments, colorants, glass beads or bubbles, antioxidants, optical brighteners, antimicrobial agents, surfactants, fire retardants, and fluorochemicals.

One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, fluid barrier or adhesive tack related properties.

i. Formation of Microfibers

A number of processes may be used to produce and deposit a population of microfibers, including, but not limited to, melt blowing, melt spinning, fiber extrusion, plexifilament formation, air-laying, wet spinning, dry spinning, or a combination thereof. Suitable processes for forming microfibers are described in U.S. Pat. No. 6,315,806 (Torobin), U.S. Pat. No. 6,114,017 (Fabbricante et al.), U.S. Pat. No. 6,382,526 B1 (Reneker et al.), and U.S. Pat. No. 6,861,025 B2 (Erickson et al.). Alternatively, a population of microfibers may be formed or converted to staple fibers and combined with a population of sub-micrometer fibers using, for example, a process as described in U.S. Pat. No. 4,118,531 (Hauser). In certain exemplary embodiments, the population of microfibers comprises a web of bonded microfibers, wherein bonding is achieved using thermal bonding, adhesive bonding, powdered binder, hydroentangling, needlepunching, calendering, or a combination thereof, as described below.

b. Spun-Bonded and Carded Fibers

In one exemplary embodiment of the present disclosure, the support layer comprises a spun-bonded fabric comprising polypropylene fibers. In a further exemplary embodiment of the present disclosure, the support layer comprises a carded web of staple length fibers, wherein the staple length fibers comprise: (i) low-melting temperature or binder fibers; and (ii) high-melting temperature or structural fibers. Typically, the binder fibers have a melting temperature of at least 10° C. less than a melting temperature of the structural fibers, although the difference between the melting temperature of the binder fibers and structural fibers may be greater than 10° C. Suitable binder fibers include, but are not limited to, any of the above-mentioned polymeric fibers. Suitable structural fibers include, but are not limited to, any of the above-mentioned polymeric fibers, as well as inorganic fibers such as ceramic fibers, glass fibers, and metal fibers; and organic fibers such as cellulosic fibers.

In certain presently preferred embodiments, the support layer comprises a carded web of staple length fibers, wherein the staple length fibers comprise a blend of PET monocomponent, and PET/coPET bicomponent staple fibers. In one exemplary presently preferred embodiment, the support layer comprises a carded web of staple length fibers, wherein the staple length fibers comprise: (i) about 20 weight percent bicomponent binder fibers (e.g. INVISTA™ T254 fibers, available from Invista, Inc., Wichita, Kans.), 12 d×1.5"; and (ii) about 80 weight percent structural fibers (e.g. INVISTA™ T293 PET fibers), 32 d×3".

As described above, the support layer may comprise one or more layers in combination with one another. In one exemplary embodiment, the support layer comprises a first layer, such as a nonwoven fabric or a film, and an adhesive layer on the first layer opposite the sub-micrometer fiber component. In this embodiment, the adhesive layer may cover a portion of or the entire outer surface of the first layer. The adhesive may comprise any known adhesive including pressure-sensitive adhesives, heat activatable adhesives, etc. When the adhesive layer comprises a pressure-sensitive adhesive, the composite nonwoven fibrous article may further comprise a release liner to provide temporary protection of the pressure-sensitive adhesive.

c. Sub-Micrometer Fibers

Exemplary patterned air-laid nonwoven fibrous webs 234 of the present disclosure may optionally comprise a population of sub-micrometer fibers. In some presently preferred embodiments, the population of sub-micrometer fibers comprises a layer adjoining the patterned air-laid nonwoven fibrous web 234. The at least one layer comprising a sub-micrometer fiber component may be an underlayer (e.g. a support layer or collector for the patterned air-laid nonwoven fibrous web 234), but more preferably is used as an overlayer or cover layer. The population of sub-micrometer fibers may be co-formed with the patterned air-laid nonwoven fibrous web 234, or may be pre-formed as a web roll (see e.g. web rolls 260 and 262 in FIG. 3) before forming the patterned air-laid nonwoven fibrous web 234 and unrolled to provide a collector (see e.g. web roll 260 and collector 232 in FIG. 3) or cover layer (see e.g. web roll 262 and cover layer 230 in FIG. 3) for the patterned air-laid nonwoven fibrous web 234, or alternatively or additionally may be post-formed after forming the patterned air-laid nonwoven fibrous web 234, and applied adjoining, preferably overlaying, the patterned air-laid nonwoven fibrous web 234 (see e.g. post-forming applicator 216 applying fibers 218 to patterned air-laid nonwoven fibrous web 234 in FIG. 3).

In certain exemplary embodiments, the fine fiber component comprises a population of fine microfibers having a population median diameter less than 10 μm. In other exemplary embodiments, the fine fiber component comprises a population of ultrafine microfibers having a population median diameter less than about 2 μm. In certain presently preferred embodiments, the fine fiber component comprises a population of sub-micrometer fibers having a population median diameter less than 1 μm.

In some exemplary embodiments, the sub-micrometer fiber component comprises a fiber population having a population median fiber diameter ranging from about 0.2 μm to about 0.9 μm. In other exemplary embodiments, the sub-micrometer fiber component comprises a fiber population having a population median fiber diameter ranging from about 0.5 μm to about 0.7 μm.

In the present disclosure, the "median fiber diameter" of fibers in a given sub-micrometer fiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 2. However, in some cases, x may be selected to be as low as 30 or even 20. These lower values of x may be particularly useful for highly entangled fibers.

In some exemplary embodiments, the sub-micrometer fiber component may comprise one or more polymeric materials. Suitable polymeric materials include, but are not limited to, polyolefins such as polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

The sub-micrometer fiber component may comprise monocomponent fibers comprising any one of the above-mentioned polymers or copolymers. In this exemplary embodiment, the monocomponent fibers may contain additives as described below, but comprise a single fiber-forming material selected from the above-described polymeric materials. Further, in this exemplary embodiment, the monocomponent fibers typically comprise at least 75 weight percent of any one of the above-described polymeric materials with up to 25 weight percent of one or more additives. Desirably, the monocomponent fibers comprise at least 80 weight percent, more desirably at least 85 weight percent, at least 90 weight percent, at least 95 weight percent, and as much as 100 weight percent of any one of the above-described polymeric materials, wherein all weights are based on a total weight of the fiber.

The sub-micrometer fiber component may also comprise multi-component fibers formed from (1) two or more of the above-described polymeric materials and (2) one or more additives as described below. As used herein, the term "multi-component fiber" is used to refer to a fiber formed from two or more polymeric materials. Suitable multi-component fiber configurations include, but are not limited to, a sheath-core configuration, a side-by-side, a layered or a segmented pie/wedge configuration (for example, U.S. Pat. No. 4,729,371 describes layered bicomponent meltblown fibers, also referred to as striped fibers; and PCT International Publication No. WO 2008/085545 describes segmented pie/wedge fibers and layered fibers in FIGS. 1a-1e), and an "islands-in-the-sea" configuration (for example, fibers produced by Kuraray Company, Ltd., Okayama, Japan).

For sub-micrometer fiber components formed from multi-component fibers, desirably the multi-component fiber comprises (1) from about 75 to about 99 weight percent of two or more of the above-described polymers and (2) from about 25 to about 1 weight percent of one or more additional fiber-forming materials based on the total weight of the fiber.

The methods of making patterned air-laid nonwoven fibrous webs of the present disclosure may be used to form a sub-micrometer fiber component containing fibers formed from any of the above-mentioned polymeric materials. Typically, the sub-micrometer fiber forming method step involves melt extruding a thermoformable material at a melt extrusion temperature ranging from about 130° C. to about 350° C. A die assembly and/or coaxial nozzle assembly (see, for example, the Torobin process referenced above) comprises a population of spinnerets and/or coaxial nozzles through which molten thermoformable material is extruded. In one exemplary embodiment, the coaxial nozzle assembly comprises a population of coaxial nozzles formed into an array so as to extrude multiple streams of fibers onto a support layer or substrate. See, for example, U.S. Pat. No. 4,536,361 (FIG. 2) and U.S. Pat. No. 6,183,670 (FIGS. 1-2).

In some exemplary embodiments, a patterned air-laid nonwoven fibrous web layer may be formed of sub-micrometer fibers commingled with coarser microfibers providing a support structure for the sub-micrometer nonwoven fibers. The support structure may provide the resiliency and strength to hold the fine sub-micrometer fibers in the preferred low Solidity form. The support structure could be made from a number of different components, either singly or in concert. Examples of supporting components include, for example, microfibers, discontinuous oriented fibers, natural fibers, foamed porous cellular materials, and continuous or discontinuous non oriented fibers.

In one exemplary embodiment, a microfiber stream is formed and a sub-micrometer fiber stream is separately formed and added to the microfiber stream to form the patterned air-laid nonwoven fibrous web. In another exemplary embodiment, a sub-micrometer fiber stream is formed and a microfiber stream is separately formed and added to the sub-micrometer fiber stream to form the patterned air-laid nonwoven fibrous web. In these exemplary embodiments, either one or both of the sub-micrometer fiber stream and the microfiber stream is oriented. In an additional embodiment, an oriented sub-micrometer fiber stream is formed and discontinuous microfibers are added to the sub-micrometer fiber stream, e.g. using a process as described in U.S. Pat. No. 4,118,531 (Hauser).

In some exemplary embodiments, the method of making a patterned air-laid nonwoven fibrous web comprises combining the sub-micrometer fiber population and the microfiber population into a patterned air-laid nonwoven fibrous web by mixing fiber streams, hydroentangling, wet forming, plexifilament formation, or a combination thereof. In combining the sub-micrometer fiber population with the microfiber population, multiple streams of one or both types of fibers may be used, and the streams may be combined in any order. In this manner, nonwoven composite fibrous webs may be formed exhibiting various desired concentration gradients and/or layered structures.

For example, in certain exemplary embodiments, the population of sub-micrometer fibers may be combined with a population of microfibers to form an inhomogenous mixture of fibers. In other exemplary embodiments, the population of sub-micrometer fibers may be formed as an overlayer on an underlayer comprising the patterned air-laid nonwoven fibrous web 234. In certain other exemplary embodiments, the patterned air-laid nonwoven fibrous web

234 may be formed as an overlayer on an underlayer (e.g. a support layer or collector) comprising the population of sub-micrometer fibers.

i. Formation of Sub-Micrometer Fibers

A number of processes may be used to produce and deposit a population of sub-micrometer fibers, including, but not limited to melt blowing, melt spinning, electrospinning, gas jet fibrillation, or combination thereof. Suitable processes include, but are not limited to, processes disclosed in U.S. Pat. No. 3,874,886 (Levecque et al.), U.S. Pat. No. 4,363,646 (Torobin), U.S. Pat. No. 4,536,361 (Torobin), U.S. Pat. No. 6,183,670 (Torobin), U.S. Pat. No. 5,227,107 (Dickenson et al.), U.S. Pat. No. 6,114,017 (Fabbricante et al.), U.S. Pat. No. 6,382,526 B1 (Reneker et al.), U.S. Pat. No. 6,743,273 (Chung et al.), U.S. Pat. No. 6,800,226 (Gerking), and U.S. Pat. No. 6,861,025 B2 (Erickson et al.). One particularly suitable process for forming sub-micrometer fibers is described in U.S. Patent Application Pub. No. 2012/0149273 (Moore et al.). A presently-preferred process for forming sub-micrometer fibers is an electrospinning process, for example, the processes described in U.S. Pat. No. 1,975,504 (Formhals).

F. Optional Attachment Devices

In certain exemplary embodiments, the patterned air-laid fibrous webs of the present disclosure may further comprise one or more attachment devices to enable the patterned air-laid fibrous article to be attached to a substrate. As discussed above, an adhesive may be used to attach the patterned air-laid fibrous article. In addition to adhesives, other attachment devices may be used. Suitable attachment devices include, but are not limited to, any mechanical fastener such as screws, nails, clips, staples, stitching, thread, hook and loop materials, etc. Additional attachment methods include thermal bonding of the surfaces, for example, by application of heat or using ultrasonic welding or cold pressure welding.

The one or more attachment devices may be used to attach the patterned air-laid fibrous article to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

G. Methods of Making Patterned Air-Laid Fibrous Web with Optional Particulates

The disclosure also provides a method of making a patterned air-laid nonwoven fibrous web according to any of the foregoing embodiments. The method includes providing a forming chamber having an upper end and a lower end, introducing a plurality of fibers into the upper end of the forming chamber, transporting a population of the fibers to the lower end of the forming chamber as substantially discrete fibers, and capturing the population of substantially discrete fibers as a nonwoven fibrous web having an identifiable pattern on a patterned collector surface, wherein the identifiable pattern comprises a plurality of non-hollow projections (e.g. 200 in FIG. 1) extending from a major surface (e.g. 204 in FIG. 1) of the nonwoven fibrous web (e.g. 234 in FIG. 1) (as considered without the projections), and a plurality of substantially planar land areas (e.g. 202 in FIG. 1) formed between each adjoining projection in a plane defined by and substantially parallel with the major surface.

In some exemplary embodiments, the method further includes bonding at least a portion of the plurality of fibers together without the use of an adhesive prior to removal of the web from the patterned collector surface, thereby causing the fibrous web to retain the identifiable pattern. In certain exemplary embodiments, the method further includes introducing a plurality of particulates, which may be chemically active particulates, into the forming chamber and mixing the plurality of discrete fibers with the plurality of particulates within the forming chamber to form a fibrous particulate mixture before capturing the population of substantially discrete fibers as a patterned air-laid nonwoven fibrous web, and securing at least a portion of the particulates to the patterned air-laid nonwoven fibrous web.

In further exemplary embodiments of any of the foregoing methods, the patterned collector surface includes a plurality of geometrically shaped perforations extending through the collector, and capturing the population of fibers includes drawing a vacuum through the perforated patterned collector surface. In certain exemplary embodiments, the plurality of geometrically shaped perforations have a shape selected from circular, oval, polygonal, X-shape, V-shape, helical, and combinations thereof. In some particular exemplary embodiments, the plurality of geometrically shaped perforations have a polygonal shape selected from triangular, square, rectangular, diamond, trapezoidal, pentagonal, hexagonal, octagonal, and combinations thereof. In some particular exemplary embodiments, the plurality of geometrically shaped perforations includes a two-dimensional pattern on the patterned collector surface. In other exemplary embodiments, the two-dimensional pattern of geometrically shaped perforations on the patterned collector surface is a two-dimensional array.

In certain exemplary embodiments, transporting the fibrous particulate mixture to the lower end of the forming chamber to form a patterned air-laid nonwoven fibrous web comprises dropping the discrete fibers into the forming chamber and permitting the fibers to drop through the forming chamber under the force of gravity. In other exemplary embodiments, transporting the fibrous particulate mixture to the lower end of the forming chamber to form a patterned air-laid nonwoven fibrous web comprises dropping the discrete fibers into the forming chamber and permitting the fibers to drop through the forming chamber under the forces of gravity and a vacuum force applied to the lower end of the forming chamber.

In some exemplary embodiments wherein more than 0% and less than 10% wt. of the patterned air-laid nonwoven fibrous web, more preferably more than 0% and less than 10% wt. of the discrete fibers, is comprised of multi-component fibers comprising at least a first region having a first melting temperature and a second region having a second melting temperature wherein the first melting temperature is less than the second melting temperature, securing the particulates to the patterned air-laid nonwoven fibrous web comprises heating the multi-component fibers to a temperature of at least the first melting temperature and less than the second melting temperature, whereby at least a portion of the particulates are bonded to the at least first region of at least a portion of the multi-component fibers, and at least a portion of the discrete fibers are bonded together at a plurality of intersection points with the first region of the multi-component fibers.

In other exemplary embodiments wherein the plurality of discrete fibers includes a first population of monocomponent discrete thermoplastic fibers having a first melting temperature, and a second population of monocomponent discrete fibers having a second melting temperature greater than the first melting temperature, securing the particulates to the patterned air-laid nonwoven fibrous web comprises heating the thermoplastic fibers to a temperature of at least the first melting temperature and less than the second melting temperature, whereby at least a portion of the particulates are bonded to at least a portion of the first population of monocomponent discrete fibers, and further wherein at least a portion of the first population of monocomponent discrete fibers is bonded to at least a portion of the second population of monocomponent discrete fibers.

In some exemplary embodiments comprising a first population of monocomponent discrete thermoplastic fibers having a first melting temperature and a second population of monocomponent discrete fibers having a second melting temperature greater than the first melting temperature, preferably more than 0% and less than 10% wt. of the patterned air-laid nonwoven fibrous web, more preferably more than 0% and less than 10% wt. of the discrete fibers, is comprised of the first population of monocomponent discrete thermoplastic.

In certain exemplary embodiments, securing the particulates to the patterned air-laid nonwoven fibrous web comprises heating the first population of monocomponent discrete thermoplastic fibers to a temperature of at least the first melting temperature and less than the second melting temperature, whereby at least a portion of the particulates are bonded to at least a portion of the first population of monocomponent discrete thermoplastic fibers, and at least a portion of the discrete fibers are bonded together at a plurality of intersection points with the first population of monocomponent discrete thermoplastic fibers.

In any of the foregoing exemplary embodiments, securing the particulates to the patterned air-laid nonwoven fibrous web comprises at least one of thermal bonding, autogenous bonding, adhesive bonding, powdered binder binding, hydroentangling, needlepunching, calendering, or a combination thereof. In some of the foregoing embodiments, securing the particulates to the patterned air-laid nonwoven fibrous web comprises entangling the discrete fibers, thereby forming a cohesive patterned air-laid nonwoven fibrous web including a plurality of interstitial voids, each interstitial void defining a void volume having at least one opening having a median dimension defined by at least two overlapping fibers, wherein the particulates exhibit a volume less than the void volume and a median particulate size greater than the median dimension, further wherein the chemically active particulates are not substantially bonded to the discrete fibers and the discrete fibers are not substantially bonded to each other.

In any of the foregoing exemplary embodiments, a liquid may be introduced into the forming chamber to wet at least a portion of the discrete fibers, whereby at least a portion of the particulates adhere to the wetted discrete fibers in the forming chamber.

In any of the foregoing embodiments, the particulates may be introduced into the forming chamber at the upper end, at the lower end, between the upper end and the lower end, or a combination thereof. In any of the foregoing embodiments, the patterned air-laid nonwoven fibrous web may be formed on a collector, wherein the collector is selected from a screen, a scrim, a mesh, a nonwoven fabric, a woven fabric, a knitted fabric, a foam layer, a porous film, a perforated film, an array of fibers, a melt-fibrillated nanofiber web, a meltblown fibrous web, a spun bond fibrous web, an air-laid fibrous web, a wet-laid fibrous web, a carded fibrous web, a hydro-entangled fibrous web, and combinations thereof.

In other examples of any of the foregoing embodiments, the method further comprises applying a fibrous cover layer overlaying the patterned air-laid nonwoven fibrous web, wherein the fibrous cover layer is formed by air-laying, wet-laying, carding, melt blowing, melt spinning, electrospinning, plexifilament formation, gas jet fibrillation, fiber splitting, or a combination thereof. In certain exemplary embodiments, the fibrous cover layer comprises a population of sub-micrometer fibers having a median fiber diameter of less than 1 µm formed by melt blowing, melt spinning, electrospinning, plexifilament formation, gas jet fibrillation, fiber splitting, or a combination thereof.

Through some embodiments of the process described below, it is possible to obtain the particulates preferentially on one surface of the nonwoven article. For open, lofty nonwoven webs, the particulates will fall through the web and preferentially be on the bottom of the nonwoven article. For dense nonwoven webs, the particulates will remain on the surface and preferentially be on the top of the nonwoven article.

Further, as described below, it is possible to obtain a distribution of the particulates throughout the thickness of the nonwoven article. In this embodiment, the particulate therefore is available on both working surfaces of the web and throughout the thickness. In one embodiment, the fibers can be wetted to aid in the clinging the particulate to the fibers until the fiber can be melted to secure the particulates. In another embodiment, for dense nonwoven webs, a vacuum can be introduced to pull the particulates throughout the thickness of the nonwoven article.

1. Apparatus for Forming Patterned Air-Laid Fibrous Webs

Figure 3:
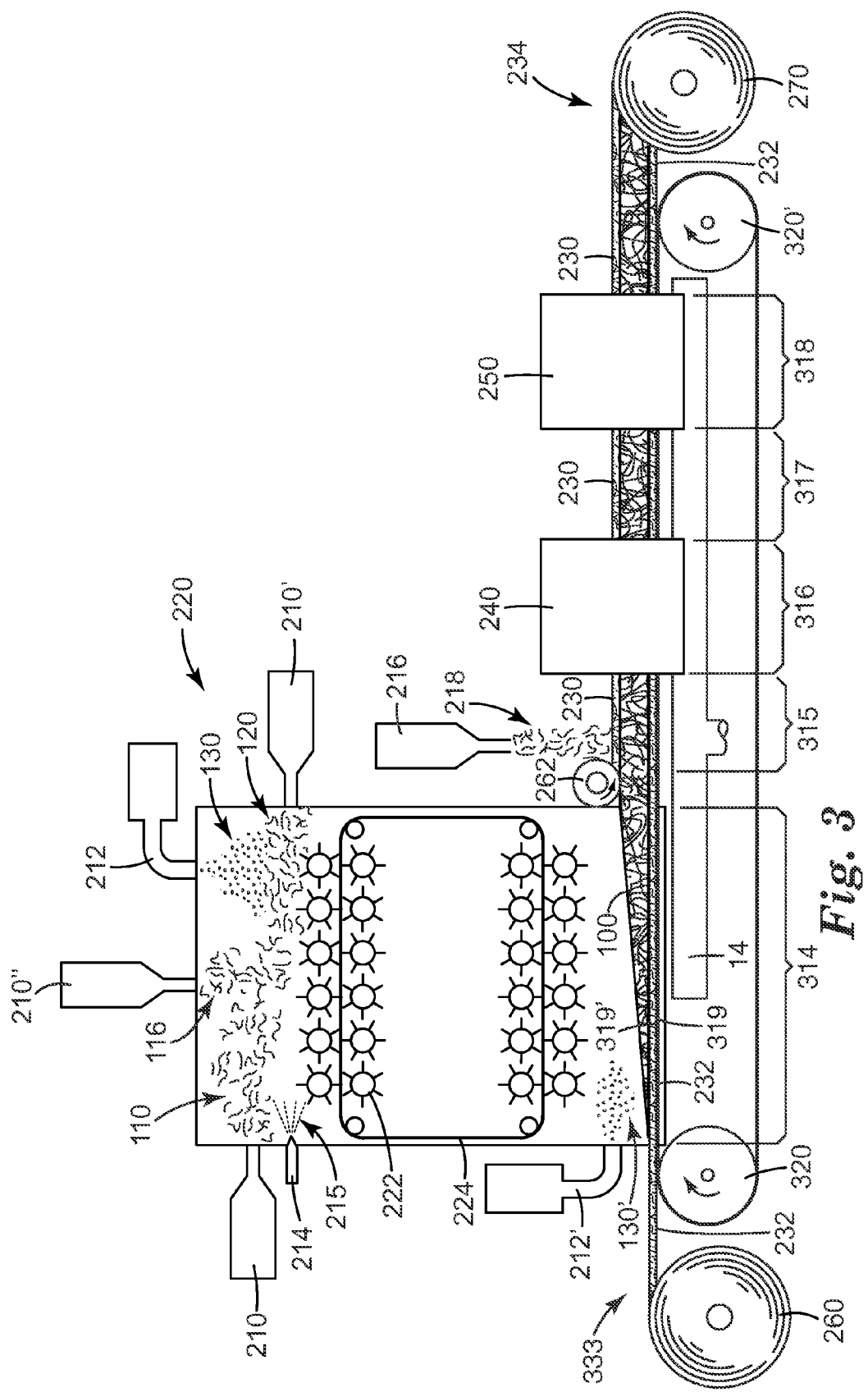
FIG. 3 is a side view showing an apparatus and process for making various embodiments of patterned air-laid nonwoven fibrous webs of the present disclosure.

FIGS. 3-4 show an illustrative apparatus for carrying out various embodiments of the disclosure as part of an exemplary apparatus for forming a patterned air-laid fibrous web. FIG. 3 is a schematic overall side view of the apparatus. FIG. 4 is a perspective view of an optional bonding apparatus. FIGS. 5A-5H are top views of various exemplary perforated patterned collector surfaces useful in forming a patterned air-laid fibrous web according to certain illustrative embodiments of the present disclosure.

An exemplary apparatus 220 which may be configured to practice various processes for making the exemplary patterned air-laid nonwoven fibrous webs 234 as described above is shown in FIG. 3. One or more discrete fiber input streams (210, 210', 210") are positioned proximate the top of a forming chamber 220 wherein the discrete fibers are mixed, blended, and ultimately form a patterned air-laid nonwoven fibrous web 234.

As shown in FIG. 3, a separate fiber stream 210 is shown introducing a plurality of multi-component fibers 110 into the forming chamber 220; a separate fiber stream 210' is shown introducing a plurality of discrete filling fibers 120 (which may be natural fibers) into the forming chamber 220; and a separate fiber stream 210" is shown introducing a first population of discrete thermoplastic fibers 116 into the forming chamber 220. However, it is to be understood that the discrete fibers need not be introduced into the forming chamber as separate streams, and at least a portion of the discrete fibers may advantageously be combined into a single fiber stream prior to entering the forming chamber 220. For example, prior to entering the forming chamber 220, an opener (not shown) may be included to open, comb, and/or blend the input discrete fibers, particularly if a blend of multi-component 110 and filling fibers 120 is included.

Furthermore, the positions at which the fiber streams (210, 210', 210") are introduced into the forming chamber 220 may be advantageously varied. For example, a fiber stream may advantageously be located at the left side, top, or right side of the forming chamber. Furthermore, a fiber stream may advantageously be positioned to introduce at the top, or even at the middle of the forming chamber 220. However, it is presently preferred that the fiber streams be introduced above endless belt screen 224, as described further below.

Also, entering the forming chamber 220 is one or more input streams (212, 212') of particulates (130, 130'). Although two streams of particulates (212, 212') are shown in FIG. 3, it is to be understood that only one stream may be used, or more than two streams may be used. It is to be understood that if multiple input streams (212, 212') are used, the particulates may be the same (not shown) or different (130, 130') in each stream (212, 212'). If multiple input streams (212, 212') are used, it is presently preferred that the particulates (130, 130') comprise distinct particulate materials.

It is further understood that the particulate input stream(s) (212, 212') may be advantageously introduced at other regions of the forming chamber 220. For example, the particulates may be introduced proximate the top of the forming chamber 220 (input stream 212 introducing particulates 130), and/or in the middle of the forming chamber (not shown), and/or at the bottom of the forming chamber 220 (input stream 212' introducing particulates 130').

Furthermore, the positions at which the particulate input streams (212, 212') are introduced into the forming chamber 220 may be advantageously varied. For example, an input stream may advantageously be located to introduce particulates (130, 130') at the left side (212'), top (212), or right side (not shown) of the forming chamber. Furthermore, an input stream may advantageously be positioned to introduce particulates (130, 130') at the top (212), middle (not shown) or bottom (212') of the forming chamber 220.

In some exemplary embodiments (e.g. wherein the particulates comprise fine particulates with median size or diameter of about 1-25 micrometers, or wherein the particulates comprise low density particulates with densities less than 1 g/ml), it is presently preferred that at least one input stream (212) for particulates (130) be introduced above endless belt screen 224, as described further below.

In other exemplary embodiments (e.g. wherein the particulates comprise coarse particulates with median size or diameter of greater than about 25 micrometers, or wherein the particulates comprise high density particulates with densities greater than 1 g/ml), it is presently preferred that at least one input stream (212') for particulates (130') be introduced below endless belt screen 224, as described further below. In certain such embodiments, it is presently preferred that at least one input stream (212') for particulates (130') be introduced at the left side of the forming chamber.

Furthermore, in certain exemplary embodiments wherein the particulates comprise extremely fine particulates with median size or diameter of less than about 5 micrometers and density greater than 1 g/ml, it is presently preferred that at least one input stream (212') for particulates be introduced at the right side of the forming chamber, preferably below endless belt screen 224, as described further below.

Additionally, in some particular exemplary embodiments, an input stream (e.g. 212) may advantageously be located to introduce particulates (e.g. 130) in a manner such that the particulates 130 are distributed substantially uniformly throughout the patterned air-laid nonwoven fibrous web 234. Alternatively, in some particular exemplary embodiments, an input stream (e.g. 212') may advantageously be located to introduce particulates (e.g. 130') in a manner such that the particulates 130 are distributed substantially at a major surface of the patterned air-laid nonwoven fibrous web 234, for example, proximate the lower major surface of patterned air-laid nonwoven fibrous web 234 in FIG. 3, or proximate the upper major surface of patterned air-laid nonwoven fibrous web 234 (not shown).

Although FIG. 3 illustrates one exemplary embodiment wherein particulates (e.g. 130') may be distributed substantially at the lower major surface of the patterned air-laid nonwoven fibrous web 234, it is to be understood that other distributions of the particulates within the patterned air-laid nonwoven fibrous web may be obtained, which will depend upon the location of the input stream of particulates into the forming chamber 220, and the nature (e.g. median particle size or diameter, density, etc.) of the particulates.

Thus, in one exemplary embodiment (not shown), an input stream of particulates may be advantageously located (e.g. proximate the lower right side of forming chamber 220) to introduce extremely coarse or high density particulates in a manner such that the particulates are distributed substantially at the top major surface of patterned air-laid nonwoven fibrous web 234. Other distributions of particulates (130, 130') on or within the patterned air-laid nonwoven fibrous web 234 are within the scope of this disclosure.

Suitable apparatus for introducing the input streams (212, 212') of particulates (130, 130') to forming chamber 220 include commercially available vibratory feeders, for example, those manufactured by K-Tron, Inc. (Pitman, N.J.). The input stream of particulates may, in some exemplary embodiments, be augmented by an air nozzle to fluidize the particulates. Suitable air nozzles are commercially available from Spraying Systems, Inc. (Wheaton, Ill.).

The forming chamber 220 is preferably a type of air-laying fiber processing equipment, such as shown and described in U.S. Pat. Nos. 7,491,354 and 6,808,664. Instead of using strong air flow to mix and inter-engaged the fibers to form a patterned air-laid nonwoven fibrous web (such as with a "RandoWebber" web forming machine, available from Rando Machine Corporation, Macedon, N.Y.), the forming chamber 220 has spike rollers 222 to blend and mix the fibers while gravity allows the fibers to fall down through the endless belt screen 224 and form a patterned air-laid nonwoven fibrous web 234 of inter-engaged fibers. With this construction of air-laying equipment, the fibers and the particulates are, in some embodiments, falling together to the bottom of the forming chamber 220 to form the patterned air-laid nonwoven fibrous web 234. In one exemplary embodiment, a vacuum can be included below the area where the patterned air-laid nonwoven fibrous web 234 forms in the forming chamber 220 (not shown).

Referring to FIGS. 3-4, in some exemplary embodiments, the formed patterned air-laid nonwoven fibrous web 234 exits the forming chamber 220 and proceeds to an optional heating unit 240, such as an oven, which, if multi-component fibers 110 are included in the patterned air-laid nonwoven fibrous web 234, is used to heat the first region 112 of the multi-component fiber 110. The melted first region 112 tends to migrate and collect at points of intersection of the fibers of the patterned air-laid nonwoven fibrous web 234. Then, upon cooling, the melted first region 112 coalesces and solidifies to create a secured, interconnected patterned air-laid nonwoven fibrous web 234.

The optional particulates 130 may, in some embodiments, be secured to the patterned air-laid nonwoven fibrous web 234 by the melted and then coalesced first region 112 of the multi-component fiber 110, or the partially melted and then coalesced first population of thermoplastic monocomponent fibers 116. Therefore, in two steps, first forming the web and then heating the web, a nonwoven web containing particulates 130 can be created without the need for binders or further coating steps.

In one exemplary embodiment, the particulates 130 fall through the fibers of the patterned air-laid nonwoven fibrous web 234 and are therefore preferentially on a lower surface of the patterned air-laid nonwoven fibrous web 234. When the patterned air-laid nonwoven fibrous web proceeds to the heating unit 240, the melted and then coalesced first region 112 of the multi-component fibers 110 located on the lower surface of the patterned air-laid nonwoven fibrous web 234 secures the particulates 130 to the patterned air-laid nonwoven fibrous web 234, preferably without the need for an additional binder coating.

In another exemplary embodiment, when the patterned air-laid nonwoven fibrous web is a relatively dense web with small openings, the particulates 130 remain preferentially on a top surface 234 of the patterned air-laid nonwoven fibrous web 234. In such an embodiment, a gradient may form of the particulates partially falling through some of the openings of the web. When the patterned air-laid nonwoven fibrous web 234 proceeds to the heating unit 240, the melted and then coalesced first region 112 of the multi-component fibers 110 (or partially melted thermoplastic monocomponent fibers 116) located on or proximate the top surface of the patterned air-laid nonwoven fibrous web 234 secures the particulates 130 to the patterned air-laid nonwoven fibrous web 234, preferably without the need for an additional binder coating.

In another embodiment, a liquid 215, which is preferably water or an aqueous solution, is introduced as a mist from an atomizer 214. The liquid 215 preferably wets the discrete fibers (110, 116, 120), so that the particulates (130, 130') cling to the surface of the fibers. Therefore, the particulates (130, 130') are generally dispersed throughout the thickness of the patterned air-laid nonwoven fibrous web 234. When the patterned air-laid nonwoven fibrous web 234 proceeds to the heating unit 240, the liquid 215 preferably evaporates while the first region 112 of the (multi-component or thermoplastic monocomponent) discrete fiber 110 melts. The melted and then coalesced first region 112 of the multi-component (or thermoplastic monocomponent) discrete fiber secures the fibers of the patterned air-laid nonwoven fibrous web 234 together, and additionally secures the particulates (130, 130') to the patterned air-laid nonwoven fibrous web 234, without the need for an additional binder coating.

The mist of liquid 215 is shown wetting the fibers 110, and 116 and 120, if included, after introduction of the discrete fibers (110, 116, 120) into the forming chamber 220. However, wetting of the fibers could occur at other locations in the process, including before introduction of the discrete fibers (110, 116, 120) into the forming chamber 220. For example, liquid may be introduced at the bottom of the forming chamber 220 to wet the patterned air-laid nonwoven fibrous web 234 while the particulates 130 are being dropped. The mist if liquid 215 could additionally or alternatively be introduced at the top of the forming chamber 220, or in the middle of the forming chamber 220 to wet the particulates (130, 130') and discrete fibers (110, 116, 120) prior to dropping.

It is understood that the particulates 130 chosen must be capable of withstanding the heat that the patterned air-laid nonwoven fibrous web 234 is exposed to in order to melt the first region 112 of the multi-component fiber 110. Generally, the heat is provided at or to 100 to 150° C. Further, it is understood that the particulates 130 chosen must be capable of withstanding the mist of liquid solution 214, if included. Therefore, the liquid of the mist may be an aqueous solution, and in another embodiment, the liquid of the mist may be an organic solvent solution.

Exemplary patterned air-laid nonwoven fibrous webs 234 of the present disclosure may optionally include at least one additional layer adjoining the patterned air-laid nonwoven fibrous web 234 comprising a plurality of discrete fibers and a plurality of particulates. The at least one adjoining layer may be an underlayer (e.g. a support layer 232 for the patterned air-laid nonwoven fibrous web 234), an overlayer (e.g. cover layer 230), or a combination thereof. The at least one adjoining layer need not directly contact a major surface of the patterned air-laid nonwoven fibrous web 234, but preferably does contact at least one major surface of the patterned air-laid nonwoven fibrous web 234.

In some exemplary embodiments, the at least one additional layer may be pre-formed, for example, as a web roll (see e.g. web rolls 260 and 262 in FIG. 3) produced before forming the patterned air-laid nonwoven fibrous web 234. In some exemplary embodiments, web roll 260 may be unrolled and passed under the forming chamber 220 to provide a collector 232 for the patterned air-laid nonwoven fibrous web 234. In certain exemplary embodiments, the web roll 262 may be positioned to apply a cover layer 230 after the patterned air-laid nonwoven fibrous web 234 exits the forming chamber 220.

In other exemplary embodiments, the at least one adjoining layer may be co-formed with the patterned air-laid nonwoven fibrous web 234 using, for example, post-forming applicator 216 which is shown applying a plurality of fibers 218 (which, in some presently preferred embodiments, comprises a population of fibers having a median diameter less than one micrometer) adjoining (preferably contacting) a major surface of patterned air-laid nonwoven fibrous web 234, thereby forming a multilayer patterned air-laid nonwoven fibrous web 234 which, in some embodiments, is useful in manufacturing a filtration article.

As noted above, exemplary patterned air-laid nonwoven fibrous webs 234 of the present disclosure may optionally comprise a population of sub-micrometer fibers. In some presently preferred embodiments, the population of sub-micrometer fibers comprises a layer adjoining the patterned air-laid nonwoven fibrous web 234. The at least one layer comprising a sub-micrometer fiber component may be an underlayer (e.g. a support layer or collector for the patterned air-laid nonwoven fibrous web 234), but more preferably is used as an overlayer or cover layer. The population of sub-micrometer fibers may be co-formed with the patterned air-laid nonwoven fibrous web 234, or may be pre-formed as a web roll (see e.g. web rolls 260 and 262 in FIG. 3) before forming the patterned air-laid nonwoven fibrous web 234 and unrolled to provide a collector (see e.g. web roll 260 and collector 232 in FIG. 3) or cover layer (see e.g. web roll 262 and cover layer 230 in FIG. 3) for the patterned air-laid nonwoven fibrous web 234, or alternatively or additionally may be post-formed after forming the patterned air-laid nonwoven fibrous web 234, and applied adjoining, preferably overlaying, the patterned air-laid nonwoven fibrous web 234 (see e.g. post-forming applicator 216 applying fibers 218 to patterned air-laid nonwoven fibrous web 234 in FIG. 3).

In exemplary embodiments in which the population of sub-micrometer fibers is co-formed with the patterned air-laid nonwoven fibrous web 234, the population of sub-micrometer fibers may be deposited onto a surface of the patterned air-laid nonwoven fibrous web 234 so as to form a population of sub-micrometer fibers at or near the surface of the web. The method may comprise a step wherein the patterned air-laid nonwoven fibrous web 234, which optionally may include a support layer or collector 232, is passed through a fiber stream of sub-micrometer fibers having a median fiber diameter of less than 1 micrometer (μm). While passing through the fiber stream, sub-micrometer fibers may be deposited onto the patterned air-laid nonwoven fibrous web 234 (e.g. in region 315) so as to be temporarily or permanently bonded to the support layer. When the fibers are deposited onto the support layer, the fibers may optionally bond to one another, and may further harden while on the support layer.

The population of sub-micrometer fibers may be co-formed with the patterned air-laid nonwoven fibrous web 234, or may be pre-formed as a web roll (see e.g. web rolls 260 and 262 in FIG. 3) before forming the patterned air-laid nonwoven fibrous web 234 and unrolled to provide a collector (see e.g. web roll 260 and collector 232 in FIG. 3) or cover layer (see e.g. web roll 262 and cover layer 230 in FIG. 3) for the patterned air-laid nonwoven fibrous web 234, or alternatively or additionally, may be post-formed after forming the patterned air-laid nonwoven fibrous web 234, and applied adjoining, preferably overlaying, the patterned air-laid nonwoven fibrous web 234 (see e.g. post-forming applicator 216 applying fibers 218 to patterned air-laid nonwoven fibrous web 234 in FIG. 3).

Following formation, the patterned air-laid nonwoven fibrous web 234 passes, in some exemplary embodiments, through the optional heating unit 240, which melts and then coalesces the first regions to secure the patterned air-laid nonwoven fibrous web 234 and also secure, in certain exemplary embodiments, the particulates (130, 130'). An optional binder coating could also be included in some embodiments. Thus in one exemplary embodiment, the patterned air-laid nonwoven fibrous web 234 could proceed to a post-forming processor 250, for example, a coater wherein a liquid or dry binder could be applied to at least one major surface of the nonwoven fibrous web (e.g. the top surface, and/or the bottom surface) within region 318. The coater could be a roller coater, spray coater, immersion coater, powder coater or other known coating mechanism. The coater could apply the binder to a single surface of the patterned air-laid nonwoven fibrous web 234 or to both surfaces.

If applied to a single major surface, the patterned air-laid nonwoven fibrous web 234 may proceed to another coater (not shown), where the other major uncoated surface could be coated with a binder. It is understood that if an optional binder coating is included, that the particulate should be capable of withstanding the coating process and conditions, and the surface of any chemically active particulates should not be substantially occluded by the binder coating material.

Other post processing steps may be done to add strength or texture to the patterned air-laid nonwoven fibrous web 234. For example, the patterned air-laid nonwoven fibrous web 234 may be needle punched, calendered, hydro-entangled, embossed, or laminated to another material in post-forming processor 250.

2. Patterned Collector Surface for Forming Patterned Air-Laid Fibrous Webs

As shown in FIG. 3, the air-laid discrete fibers (115, 116, and/or 120) are collected on a patterned surface 319' of collector 319, which is illustrated in FIG. 3 as a continuous or endless belt collector running between drive rollers 270 and 320 as an essentially endless belt. The air-laid fibrous web 100 is collected over region 314, and is formed over regions 314-318 into a patterned nonwoven fibrous web 234. Although the patterned surface of the patterned nonwoven fibrous web 234 is shown opposite the a top surface distal from the patterned surface 319' of collector 319 in FIG. 1, it will be understood that in an alternative embodiment (not shown in the figures), the patterned surface of the patterned fibrous melt spun web may contact the patterned surface 319' of the collector 319.

Exemplary embodiments of the presently disclosed invention may be practiced by collecting the patterned nonwoven fibrous web 234 on a continuous screen-type collector such as the belt-type collector 319 as shown in FIG. 3, on a perforated template or stencil (see FIGS. 5A-5H) bearing a surface pattern corresponding to the perforations and overlaying at least a portion of a porous or perforated collector (e.g. the screen-type collector of FIG. 3), or on a screen-covered drum (not shown), or using alternative methods known in the art.

As shown in FIGS. 5A-5H, in some exemplary embodiments, the patterned collector surface 319' comprises a plurality of geometrically shaped perforations 500 extending through the collector 319, and capturing the population of fibers comprises drawing a vacuum through the perforated patterned collector surface. It will be understood that while an integral collector with a perforated patterned surface is shown in FIG. 3, other implementations, for example, a perforated patterned stencil or template positioned on a porous or perforated screen or belt, may be used as well.

In some exemplary embodiments, the plurality of geometrically shaped perforations have a shape selected from the group consisting of circular (FIGS. 5A and 5H, 319'), oval (not shown), polygonal (FIGS. 5B-5C, 5F, and 5H, 319'), V-shape (FIG. 5D; 319'), X-shape (FIG. 5E; 319'), and combinations thereof (not shown). In certain exemplary embodiments, the plurality of geometrically shaped perforations may have a polygonal shape selected from the group consisting of square (FIG. 5B; 319'), rectangular (not shown), triangular (FIG. 5C; 319'), diamond (FIG. 5F; 319'); trapezoidal (not shown), pentagonal (not shown), hexagonal (not shown), octagonal (not shown), and combinations thereof (not shown).

In additional exemplary embodiments illustrated by FIGS. 5A-5H, the plurality of geometrically shaped perforations comprises a two-dimensional pattern on the patterned collector surface. In particular exemplary embodiments, the two-dimensional pattern of geometrically shaped perforations on the patterned collector surface is a two-dimensional array, as illustrated by FIGS. 5A-5H.

Figure 5A:
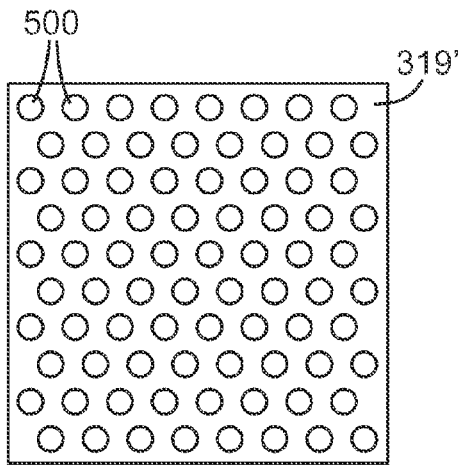
FIGS. 5A-5H are top views of various exemplary perforated patterned collector surfaces useful in forming patterned air-laid nonwoven fibrous webs according to certain illustrative embodiments of the present disclosure.
Figure 5B:
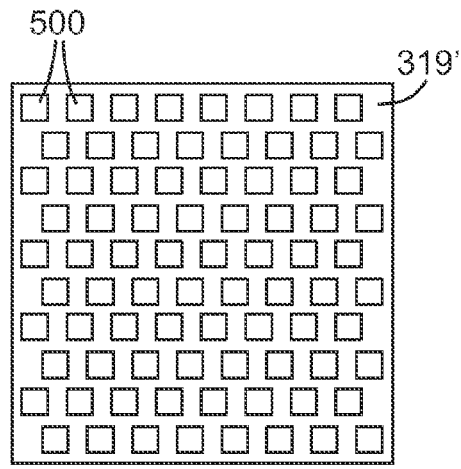
Figure 5C:
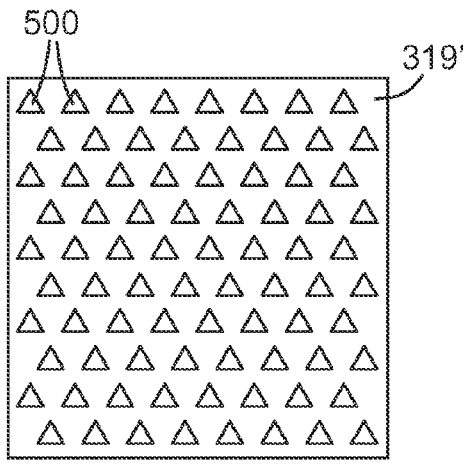
Figure 5D:
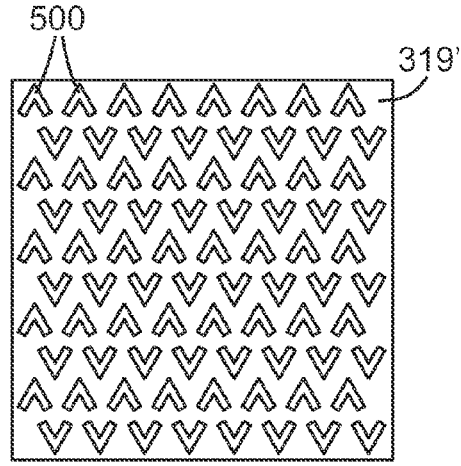
Figure 5E:
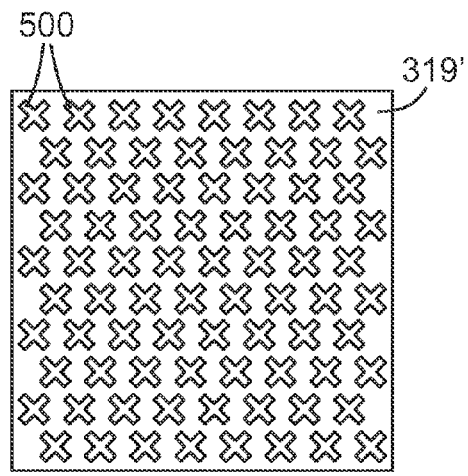
Figure 5F:
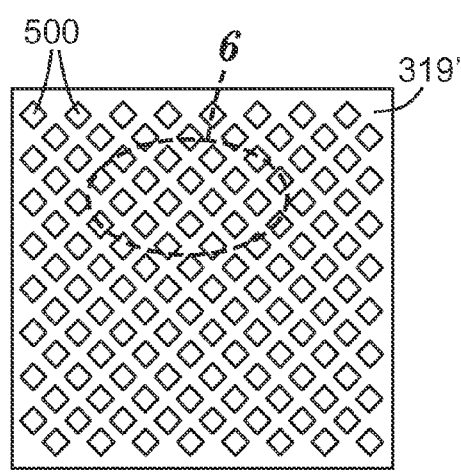
Figure 6:
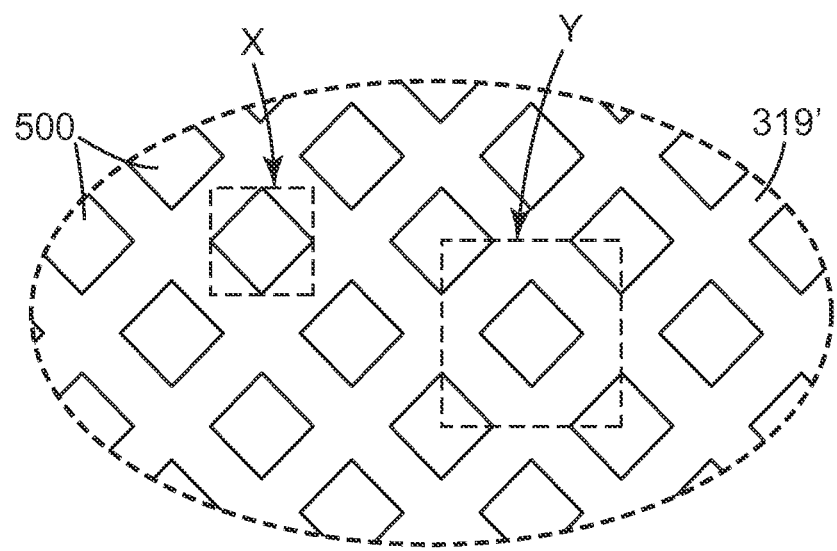
FIG. 6 is an exploded view of the exemplary perforated patterned collector surface of FIG. 5F, useful for forming patterned air-laid nonwoven fibrous webs according to an illustrative embodiment of the present disclosure.

FIG. 6 shows an expanded view of region 6 of FIG. 5F, illustrating the patterned surface 319' comprising a plurality of geometrically shaped perforations 500 extending through the collector. In some presently preferred embodiments, the mean length of the discrete fibers is selected to be less than the minimum X and maximum Y clearance opening of the plurality of geometrically shaped perforations 500, as shown in FIG. 6.

In certain exemplary embodiments, bonding comprises one or more of autogenous thermal bonding, non-autogenous thermal bonding, and ultrasonic bonding. In particular exemplary embodiments, at least a portion of the fibers is oriented in a direction determined by the pattern. Suitable bonding methods and apparatus (including autogenous bonding methods) are described in U.S. Patent Application Publication No. 2008/0026661 (Fox et al.).

3. Optional Bonding Apparatus for Producing Patterned Air-Laid Fibrous Webs

Depending on the condition of the fibers, some bonding may occur between the fibers during collection. However, further bonding between the air-laid fibers in the collected web may be needed or desirable to bond the fibers together in a manner that retains the pattern formed by the collector surface. "Bonding the fibers together" means adhering the fibers together firmly without an additional adhesive material, so that the fibers generally do not separate when the web is subjected to normal handling).

In some embodiments where light autogenous bonding provided by through-air bonding may not provide the desired web strength for peel or shear performance, it may be useful to incorporate a secondary or supplemental bonding step, for example, point bonding calendering, after removal of the patterned air-laid fibrous web from the collector surface. Other methods for achieving increased strength may include extrusion lamination or polycoating of a film layer onto the back (i.e., non-patterned) side of the patterned air-laid fibrous web, or bonding the patterned air-laid fibrous web to a support web (e.g., a conventional air-laid web, a nonporous film, a porous film, a printed film, or the like). Virtually any bonding technique may be used, for example, application of one or more adhesives to one or more surfaces to be bonded, ultrasonic welding, or other thermal bonding methods able to form localized bond patterns, as known to those skilled in the art. Such supplemental bonding may make the web more easily handled and better able to hold its shape.

Conventional bonding techniques using heat and pressure applied in a point-bonding process or by smooth calender rolls may also be used, though such processes may cause undesired deformation of fibers or compaction of the web. An alternate technique for bonding the air-laid fibers is through-air bonding as disclosed in U.S. Patent Application Publication No. 2008/0038976 (Berrigan et al.). An exemplary apparatus for performing through-air bonding (e.g. a through-air bonder) is illustrated in FIGS. 5 and 6 of the drawings.

As shown in FIGS. 5-6, patterned air-laid nonwoven fibrous webs 234 having a two- or three-dimensional patterned surface may be formed by capturing air-laid discrete fibers on a patterned collector surface 319' and bonding the fibers without an adhesive while on the collector 319, for example, by thermally bonding the fibers without use of an adhesive while on the collector 319 under a through-air bonder 240. As applied to the present disclosure, the presently preferred through-air bonding technique involves subjecting the collected patterned web of air-laid fibers to a controlled heating and quenching operation that includes a) forcefully passing through the web a gaseous stream heated to a temperature sufficient to soften the air-laid fibers sufficiently to cause the air-laid fibers to bond together at points of fiber intersection (e.g., at sufficient points of intersection to form a coherent or bonded matrix), the heated stream being applied for a discrete time too short to wholly melt the fibers, and b) immediately forcefully passing through the web a gaseous stream at a temperature at least 50° C. less than the heated stream to quench the fibers (as defined in the above-mentioned U.S. Patent Application Publication No. 2008/0038976 (Berrigan et al.), "forcefully" means that a force in addition to normal room pressure is applied to the gaseous stream to propel the stream through the web; "immediately" means as part of the same operation, i.e., without an intervening time of storage as occurs when a web is wound into a roll before the next processing step). As a shorthand term this technique is described as the quenched flow heating technique, and the apparatus as a quenched flow heater.

A variation of the described method, taught in more detail in the aforementioned U.S. Patent Application Publication No. US 2008/0038976 (Berrigan et al.), takes advantage of the presence of two different kinds of molecular phases within air-laid fibers—one kind called crystallite-characterized molecular phases because of a relatively large presence of chain-extended, or strain-induced, crystalline domains, and a second kind called amorphous-characterized phases because of a relatively large presence of domains of lower crystalline order (i.e., not chain-extended) and domains that are amorphous, though the latter may have some order or orientation of a degree insufficient for crystallinity.

These two different kinds of phases, which need not have sharp boundaries and can exist in mixture with one another, have different kinds of properties, including different melting and/or softening characteristics: the first phase characterized by a larger presence of chain-extended crystalline domains melts at a temperature (e.g., the melting point of the chain-extended crystalline domain) that is higher than the temperature at which the second phase melts or softens (e.g., the glass transition temperature of the amorphous domain as modified by the melting points of the lower-order crystalline domains).

In the stated variation of the described method, heating is at a temperature and for a time sufficient for the amorphous-characterized phase of the fibers to melt or soften while the crystallite-characterized phase remains unmelted. Generally, the heated gaseous stream is at a temperature greater than the onset melting temperature of the polymeric material of the fibers. Following heating, the web is rapidly quenched as discussed above.

Treatment of the collected web at such a temperature is found to cause the air-laid fibers to become morphologically refined. Treated fibers of certain exemplary embodiments of the presently described invention may be capable of a kind of "repeatable softening," meaning that the fibers, and particularly the amorphous-characterized phase of the fibers, will undergo to some degree a repeated cycle of softening and resolidifying as the fibers are exposed to a cycle of raised and lowered temperature within a temperature region lower than that which would cause melting of the whole fiber.

In practical terms, repeatable softening is indicated when a treated web (which already generally exhibits a useful bonding as a result of the heating and quenching treatment) can be heated to cause further autogenous bonding of the fibers. The cycling of softening and resolidifying may not continue indefinitely, but it is generally sufficient that the fibers may be initially bonded by exposure to heat, e.g., during a heat treatment according to certain exemplary embodiments of the presently described invention, and later heated again to cause re-softening and further bonding, or, if desired, other operations, such as calendering or re-shaping. For example, a web may be calendered to a smooth surface or given a nonplanar shape, e.g., molded into a face patterned collector, taking advantage of the improved bonding capability of the fibers (though in such cases the bonding is not limited to autogenous bonding).

While the amorphous-characterized, or bonding, phase has the described softening role during web-bonding, calendering, shaping or other like operation, the crystallite-characterized phase of the fiber also may have an important role, namely to reinforce the basic fiber structure of the fibers. The crystallite-characterized phase generally can remain unmelted during a bonding or like operation because its melting point is higher than the melting/softening point of the amorphous-characterized phase, and it thus remains as an intact matrix that extends throughout the fiber and supports the fiber structure and fiber dimensions.

Thus, although heating the web in an autogenous bonding operation may cause fibers to weld together by undergoing some flow and coalescence at points of fiber intersection, the basic discrete fiber structure is substantially retained over the length of the fibers between intersections and bonds; preferably, the cross-section of the fibers remains unchanged over the length of the fibers between intersections or bonds formed during the operation. Similarly, although calendering of a web may cause fibers to be reconfigured by the pressure and heat of the calendering operation (thereby causing the fibers to permanently retain the shape pressed upon them during calendering and make the web more uniform in thickness), the fibers generally remain as discrete fibers with a consequent retention of desired web porosity, filtration, and insulating properties.

As shown in FIGS. 3 and 4, in an exemplary method of carrying out certain exemplary embodiments of the present disclosure, a formed air-laid fibrous web 100 having a patterned surface formed on the patterned collector surface 319', is carried by the moving collector 319 under a controlled-heating device 240 mounted above the collector 319. As shown in FIG. 4, the exemplary heating device 240 comprises a housing 401 which is divided into an upper plenum 402 and a lower plenum 403. The upper and lower plenums are separated by a plate 404 perforated with a series of holes 405 that are typically uniform in size and spacing. A gas, typically air, is fed into the upper plenum 402 through openings 406 from conduits 407, and the plate 404 functions as a flow-distribution means to cause air fed into the upper plenum to be rather uniformly distributed when passed through the plate into the lower plenum 403. Other useful flow-distribution means include fins, baffles, manifolds, air dams, screens or sintered plates, i.e., devices that even the distribution of air.

In the illustrative heating device 240 the bottom wall 408 of the lower plenum 403 is formed with an elongated slot 409 through which an elongated or knife-like stream of heated air (not shown in FIG. 4) from the lower plenum is blown onto the patterned surface of the patterned air-laid nonwoven fibrous web 100 traveling on the collector 319 below the heating device 240 (the patterned air-laid fibrous web 100 and collector 319 are shown as a partial cut-away in FIG. 4).

In general, by controlling the temperature and velocity of the air exiting the through-air bonder, the level of autogenous bonding between the fibers that form the patterned air-laid fibrous web may be controlled. Preferably, the air flow and temperature are adjusted to allow the patterned air-laid fibrous web to be removed from the patterned collector surface without destroying the two-dimensional or three-dimensional surface pattern formed by contact with the patterned surface of the collector. However, it will be understood that there are potential advantages associated with the ability to vary the autogenous bonding level over a wide range from low bonding to high bonding level. For example, at high bonding levels, the fibers may form a stable three-dimensional structure that may allow the patterned air-laid fibrous web to be more easily handled. At lower bonding levels, the patterned air-laid fibrous web may exhibit higher extension (e.g. stretch), and may also be more readily thermally laminated to other layers without using temperatures exceeding the crystalline melting point of the material (e.g. a (co)polymer) making up the fibers.

Thus in certain exemplary embodiments, the temperature and exposure time conditions of the patterned air-laid fibrous web are carefully controlled. In certain exemplary embodiments, the temperature-time conditions may be controlled over the whole heated area of the mass. We have obtained best results when the temperature of the stream of heated air passing through the web is within a range of 5° C., and preferably within 2 or even 1° C., across the width of the mass being treated (the temperature of the heated air is often measured for convenient control of the operation at the entry point for the heated air into the housing 401, but it also can be measured adjacent the collected web with thermocouples). In addition, the heating apparatus is operated to maintain a steady temperature in the stream over time, e.g., by rapidly cycling the heater on and off to avoid over- or under-heating. Preferably the temperature is held within one degree Centigrade of the intended temperature when measured at one second intervals.

To further control heating, the mass is subjected to quenching quickly after the application of the stream of heated air. Such a quenching can generally be obtained by drawing ambient air over and through the patterned air-laid fibrous web 234 immediately after the mass leaves the controlled-heating device 240. Numeral 317 in FIG. 3 represents an area in which ambient air is drawn through the patterned web by the air-exhaust device after the web has passed through the hot air stream. Actually, such air can be drawn under the base of the housing 401, so that it reaches the web almost immediately after the web leaves the controlled-heating device 240. And the air-exhaust device (not shown) may extend along the collector for a distance 317 beyond the heating device 250 to assure thorough cooling and quenching of the whole patterned air-laid fibrous web 234. For shorthand purposes the combined heating and quenching apparatus is termed a quenched flow heater.

One aim of the quenching is to withdraw heat before undesired changes occur in the air-laid fibers contained in the web. Another aim of the quenching is to rapidly remove heat from the web and the fibers and thereby limit the extent and nature of crystallization or molecular ordering that will subsequently occur in the fibers. By rapid quenching from the molten/softened state to a solidified state, the amorphous-characterized phase is understood to be frozen into a more purified crystalline form, with reduced molecular material that can interfere with softening, or repeatable softening, of the fibers. For some purposes, quenching may not be absolutely required though it is strongly preferred for most purposes.

To achieve quenching the mass is desirably cooled by a gas at a temperature at least 50° C. less than the nominal melting point; also the quenching gas is desirably applied for a time on the order of at least one second (the nominal melting point is often stated by a polymer supplier; it can also be identified with differential scanning calorimetry, and for purposes herein, the "Nominal Melting Point" for a polymer is defined as the peak maximum of a second-heat, total-heat-flow DSC plot in the melting region of a polymer if there is only one maximum in that region; and, if there are more than one maximum indicating more than one melting point (e.g., because of the presence of two distinct crystalline phases), as the temperature at which the highest-amplitude melting peak occurs). In any event the quenching gas or other fluid has sufficient heat capacity to rapidly solidify the fibers.

In an alternative embodiment particularly useful for materials that do not form autogenous bonds to a significant extent, air-laid discrete fibers may be collected on a patterned surface of a collector and one or more additional layer(s) of fibrous material capable of bonding to the fibers may be applied on, over or around the fibers, thereby bonding together the fibers before the fibers are removed from the collector surface.

The additional layer(s) could be, for example, one or more meltblown layers, or one or more extrusion laminated film layer(s). The layer(s) would not need to be physically entangled, but would generally need some level of interlayer bonding along the interface between layer(s). In such embodiments, it may not be necessary to bond together the fibers using through-air bonding in order to retain the pattern on the surface of the patterned air-laid fibrous web.

4. Optional Processing Steps for Producing Patterned Air-Laid Fibrous Webs

In addition to the foregoing methods of making a patterned air-laid fibrous web, one or more of the following process steps may be carried out on the web once formed:

(1) advancing the patterned air-laid fibrous web along a process pathway toward further processing operations;

(2) bringing one or more additional layers into contact with an outer surface of the patterned air-laid fibrous web;

(3) calendering the patterned air-laid fibrous web;

(4) coating the patterned air-laid fibrous web with a surface treatment or other composition (e.g., a fire retardant composition, an adhesive composition, or a print layer);

(5) attaching the patterned air-laid fibrous web to a cardboard or plastic tube;

(6) winding-up the patterned air-laid fibrous web in the form of a roll;

(7) slitting the patterned air-laid fibrous web to form two or more slit rolls and/or a plurality of slit sheets;

(8) placing the patterned air-laid fibrous web in a mold and molding the patterned air-laid fibrous web into a new shape;

(9) applying a release liner over an exposed optional pressure-sensitive adhesive layer, when present; and

(10) attaching the patterned air-laid fibrous web to another substrate via an adhesive or any other attachment device including, but not limited to, clips, brackets, bolts/screws, nails, and straps.

H. Methods of Using Patterned Air-Laid Fibrous Webs

The present disclosure is also directed to methods of using the patterned air-laid nonwoven fibrous webs 234 of the present disclosure in a variety of applications. In yet another aspect, the disclosure relates to articles comprising any of the patterned air-laid nonwoven fibrous webs described above prepared according to any of the foregoing methods. Certain particulate-free patterned air-laid nonwoven fibrous webs may be useful as a gas filtration article, a liquid filtration article, a sound absorption article, a thermal insulation article, a surface cleaning article, a floor mat, a cellular growth support article, a drug delivery article, a personal hygiene article, and a wound dressing article.

For example, exemplary particulate-free patterned air-laid nonwoven fibrous webs 234 of the present disclosure may be useful in providing a fluid distribution layer when used for gas or liquid filtration. Exemplary particulate-free patterned air-laid fibrous webs of the present disclosure may provide additional surface area for thermal or acoustical dampening. Exemplary particulate-free patterned air-laid fibrous webs of the present disclosure may provide a particularly effective textured surface for use in a wipe for surface cleaning, because the pattern may have the advantage of providing a reservoir for cleaning agents and high surface for trapping debris. Exemplary particulate-free patterned air-laid fibrous webs of the present disclosure may be useful in providing a dust extraction layer in an abrasive article for use in a sanding operation. Exemplary particulate-free patterned air-laid fibrous webs of the present disclosure may provide a scaffold for supporting cell growth, or an easily removable textured wound dressing material exhibiting less surface contact with the wound, and therefore being more readily removable and allowing the wound to breathe. In some applications, the unique orientation of the fibers as determined by the pattern may lead to selective wicking of fluids.

Exemplary particulate-free patterned air-laid fibrous webs of the present disclosure may be particularly useful as a loop material for a hook-and-loop mechanical fastener or closure. In certain embodiments, a light bonding level obtained after through-air bonding may allow a hook to more easily penetrate the surface of a patterned air-laid fibrous web and engage with the loops formed by the fibers of the web.

I. Methods of Using Patterned Air-Laid Nonwoven Fibrous Webs Including Particulates Any of the foregoing exemplary embodiments of patterned air-laid nonwoven fibrous webs 234 comprising a plurality of randomly oriented discrete fibers 2 and optionally a plurality of particulates 130, may be used to make an article selected from a gas filtration article, a liquid filtration article, a surface cleaning article, an abrasive article, a floor mat, an insulation article, a cellular growth support article, a drug delivery article, a personal hygiene article, and a wound dressing article.

In certain presently preferred embodiments, the nonwoven fibrous web of any of the foregoing embodiments may be used to make a fluid filtration article comprising a fluid-impermeable housing surrounding the nonwoven fibrous web, the housing comprising at least one fluid inlet in fluid communication with a first major surface of the nonwoven fibrous web, and at least one fluid outlet in fluid communication with a second major surface of the nonwoven fibrous web opposite the first major surface of the nonwoven fibrous web.

It is understood that a variety of filtration articles can be made from various nonwoven fibrous webs containing various particulates, which are preferably chemically active particulates. Liquid (e.g. water) filtration media, gas (e.g. air) filtration media, furnace filters, respirators, and the like could beneficially manufactured to include nonwoven fibrous webs containing particulates, more preferably chemically active particulates.

In other exemplary embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the patterned air-laid nonwoven fibrous web 234.

In certain presently preferred embodiments, the fluid filtration medium comprises a first layer comprising a population of microfibers having a population median diameter of at least 1 µm, and a second layer overlaying the first layer comprising a population of sub-micrometer fibers having a population median diameter less than 1 µm. In some exemplary embodiments, the first layer adjoins the porous support. Such a fluid filtration medium may be particularly useful for depth filtration applications in which the first layer comprising the population of microfibers is contacted by a permeating fluid before the second layer comprising the population of sub-micrometer fibers.

In other exemplary embodiments (not shown), the second layer adjoins the porous support. Such a fluid filtration medium may be particularly useful for absolute filtration applications in which the first layer comprising the population of microfibers is contacted by a permeating fluid after the second layer comprising the population of sub-micrometer fibers.

In another exemplary embodiment (not shown) provides that the fluid filtration article element a sorbent density gradient in an axial configuration. An alternative exemplary embodiment (not shown) provides that the fluid filtration element has a sorbent density gradient in a radial configuration. In one particular embodiment, the fluid filtration element further comprises a plurality of layers of a second web of self-supporting nonwoven polymer fibers that are substantially free of sorbent particulates.

In another exemplary embodiment (not shown), the disclosure provides a fluid filtration element comprising two or more porous layers wound to form a porous fluid filtration article, wherein the porous layers comprise a web of self-supporting nonwoven polymeric fibers and a plurality of particulates enmeshed in the web. The fluid filtration article may also include a fluid-impermeable housing surrounding the porous article, an inlet in fluid communication with a first (coarse fiber) layer, which may be an overlayer or an underlayer; and an outlet in fluid communication with a second (fine fiber) layer, which may correspondingly be an underlayer or an overlayer.

In certain exemplary embodiments, the housing may include at least one fluid inlet in fluid communication with a first layer comprising a population of microfibers having a population median diameter of at least 1 µm, and at least one fluid outlet in fluid communication with a second layer comprising a population of sub-micrometer fibers having a population median diameter less than 1 µm, adjoining the first layer. In one exemplary embodiment, the first and second layers may be fused together. In another exemplary embodiment, the porous layers are separate composite layers.

In other embodiments (not shown), additional layers may be formed by additional adjoining overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the patterned air-laid nonwoven fibrous web or filtration element 234.

The fluid filtration article may take a variety of shapes and forms. In certain exemplary embodiments, the fluid filtration article takes the form of a three-dimensional geometric shape, which in certain exemplary embodiments, may be selected from a cylinder, a circular disc, an elliptical disk, or a polygonal disk. Other suitable shapes and forms are known to those skilled in the art.

A further aspect provides a method of filtering a fluid, the method comprising contacting a fluid filtration article with a permeating fluid. In certain exemplary embodiments, the fluid filtration article comprises a nonwoven fibrous web (or web stack) comprising a plurality of porous layers wound to form a porous article, wherein the porous layers comprise a web of self-supporting nonwoven polymeric fiber layers as previously described, and optionally, a plurality of sorbent particulates enmeshed in the web; a fluid-impermeable housing surrounding the porous article; an inlet in fluid communication with the first surface; and an outlet in fluid communication with the second surface.

In certain exemplary embodiments (not shown), the patterned air-laid nonwoven fibrous web 234 comprises a first layer or region comprising a population of microfibers having a population median diameter of at least 1 µm, and a second layer or region overlaying the first layer or region and comprising a population of sub-micrometer fibers having a population median diameter less than 1 µm. In some exemplary embodiments, the first layer or region adjoins the porous support, which preferably comprises a plurality of discrete fibers and a plurality of particulates.

The exemplary presently disclosed fluid filtration articles may be used in a variety of ways. In one exemplary embodiment, a permeating fluid passes through the first layer before passing through the second layer. In another exemplary embodiment, a permeating fluid passes through the second layer before passing through the first layer. In a further exemplary embodiment, the second layer is pleated, and the permeating fluid passes through the second layer before passing through the first layer.

In some embodiments, a permeating liquid may be passed through the fluid filtration article under the force of gravity. In other exemplary embodiments, a permeating fluid, which may be a liquid or a gas, may be passed through the fluid filtration article under conditions of pressurized fluid flow, for example, using a liquid pump, gas blower or gas compressor. In some exemplary embodiments, fluid filtration articles according to exemplary presently disclosed embodiments may exhibit reduced pressure drop under conditions of pressurized fluid flow.

Exemplary embodiments of nonwoven fibrous webs including particulates have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

In the following Examples and Table 1, "PE" denotes polyethylene, "PET" denotes polyethylene terephthalate, and "PP" denotes polypropylene.

TABLE 1

| Example | Trade Designation | Supplier | Material Type | State: Fiber Dimensions | Weight (%) |
|---|---|---|---|---|---|
| Example 1 | O-Cel-O | 3M Company St. Paul, MN | Hammer-milled sponge | Sponge Particles | 80% of web wt. |
| Example 1 | Trevira T-255 | Trevira GmbH, Hattersheim, Germany | PE/PET bicomponent fiber | Fiber: 1.3 dtex × 6 mm | 20% of web wt. |
| Example 2 | Trevira T-255 | Trevira GmbH, Hattersheim, Germany | PE/PET bicomponent fiber | Fiber: 1.3 dtex × 6 mm | 100% of web wt. |
| Example 3 | Blown Micro Fibers (BMF) | 3M Company St. Paul, MN | 3M 1250 furnace filter, PP scrap | Hammer-milled scrap | 50% of fiber wt. |
| Example 3 | Trevira T-255 | Trevira GmbH, Hattersheim, Germany | PE/PET bicomponent fiber | Fiber: 1.3 dtex × 6 mm | 50% of fiber wt. |
| Example 4 | Blown Micro Fibers | Trevira GmbH, Hattersheim, Germany | 3M 1250 furnace filter, PP scrap | Hammer-milled scrap | 50% of fiber wt. |
| Example 4 | Trevira T-255 | Trevira GmbH, Hattersheim, Germany | PE/PET bicomponent fiber | Fiber: 1.3 dtex × 6 mm | 50% of fiber wt. |
| Example 4 | Kuraray GG Carbon | Kuraray Chemical Co., Ltd., Osaka, Japan | Activated carbon granule | Carbon Particulates: 12 × 20 grade | 400 g/min @ 1 m/min |
| Example 5 | NYBCF | MiniFibers, Inc., Johnson City, TN, USA | Nylon | Fiber: 12 d × 3 mm | 50% of fiber wt. |
| Example 5 | Trevira T-255 | Trevira GmbH in Hattersheim, Germany | PE/PET bicomponent fiber | Fiber: 1.3 dtex × 6 mm | 50% of fiber wt. |
| Example 5 | Kuraray GG Carbon | Kuraray Chemical Co., Ltd., Osaka, Japan | Activated carbon granule | Carbon Particulates: 12 × 20 grade | 700 g/min @ 1 m/min |
| Example 6 | Trevira T-255 | Trevira GmbH, Hattersheim, Germany | PE/PET bicomponent fiber | Fiber: 1.3 dtex × 6 mm | 100% of fiber wt. |
| Example 6 | Kuraray GG Carbon | Kuraray Chemical Co., Ltd., Osaka, Japan | Activated carbon granule | Carbon Particulates: 12 × 20 grade | 400 g/min @ 1 m/min |

Test Methods
Basis Weight Measurement

The basis weight for exemplary nonwoven fibrous webs containing particulates was measured with a Mettler Toledo XS4002S electronic balance (commercially available from Mettler-Toledo SAS, Viroflay, France).

Patterned Collectors

Air-laid nonwoven fibrous web samples comprising a plurality of randomly oriented discrete fibers defining a plurality of square-shaped non-hollow projections extending from a major surface of the nonwoven fibrous web, and a plurality of substantially planar land areas formed between each adjoining projection in a plane defined by and substantially parallel with the major surface (i.e. all samples except Example 3) were prepared by air-laying materials onto a template with 0.625 inch by 0.625 inch by 1.5 inch openings arranged in a diamond cut pattern as generally shown in FIG. 5F. The patterned template collector was fed into the forming chamber on the top surface of the endless forming belt/wire running at the lower end of the forming chamber moving at a speed of 1 m/min.

A corrugated patterned sample (Example 3) comprising a plurality of randomly oriented discrete fibers defining a plurality of substantially parallel lateral corrugations, each corrugation defining a non-hollow projection extending from a major surface of the nonwoven fibrous web, with a plurality of substantially planar land areas formed between each adjoining projection in a plane defined by and substantially parallel with the major surface, was prepared by air-laying materials onto a collector template encompassing a fine mesh corrugated screen having a 5.75 cm peak-to-peak corrugation. The corrugated screen template (collector) was fed into the forming chamber on the top surface of the endless forming belt/wire running at the lower end of the forming chamber moving at a speed of 1 m/min.

Preparative Example A: Preparation of Hammer-Milled Blow Microfiber (BMF) Scrap

Hammer-milled materials were prepared as follows. 3M O-Cel-O sponge or 3M 1250 furnace filter polypropylene scrap was fed into a Hammer Mill EU-2B (available from EUROMILLING a/s., Tølløse, Denmark). Materials were hammer-milled through a screen of 8 mm openings to generate particles used in the SPIKE air-laying process as described further below.

Preparation of Patterned Air-Laid Nonwoven Fibrous Webs

In each of the following Examples, a SPIKE air-laying forming apparatus (commercially available from FormFiber NV, Denmark) was used to prepare nonwoven fibrous webs containing a plurality of discrete fibers and optionally a plurality of particulates. Details of the SPIKE apparatus and methods of using the SPIKE apparatus in forming air-laid webs is described in U.S. Pat. Nos. 7,491,354 and 6,808,664.

Example 1—Patterned Air-Laid Nonwoven Fibrous Web

The bicomponent fibers and the hammer-milled sponge were fed into a split pre-opening and blending chamber with two rotating spike rollers with a conveyor belt with a width of 0.6 m at a velocity 2 m/min. The bicomponent fibers were fed with a mass flowrate of 80 g/min to this chamber onto this conveyor belt. The hammer-milled sponges were fed with a mass flowrate of 320 g/min to this chamber onto this conveyor belt. Thereafter, the blend was fed into the top of the forming chamber having a blower having a flow rate of 2300 m$^3$/h and set up at 65% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen. The fibers were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the diamond-cut template thereby forming a three-dimensional nonwoven fibrous web containing the sponge particulates supported by the support layer underneath.

The web was then conveyed into an electric oven (125-130° C.) with a line speed of 1.1 m/min, which melts the sheath of the bicomponent fibers. In this example, the web was removed immediately after the oven. The oven was an electric oven from International Thermal System, LLC (Milwaukee, Wis.). The oven has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 60% setting and re-circulated at 40%, the temperature was 127° C. in the chamber. The sample was passed once in the chamber. The resulting web was a flexible, absorbent web and was visually observed to have sponge particles homogenously distributed within the obtained three-dimensional web.

Example 2—Patterned Air-Laid Nonwoven Fibrous Web

The bicomponent fibers were fed into a split pre-opening and blending chamber with two rotating spike rollers with a conveyor belt with a width of 0.6 m at a velocity 2 m/min. The bicomponent fibers were fed with a mass flowrate of 200 g/min to this chamber onto this conveyor belt. Thereafter, the fibers were fed into the top of the forming chamber having a blower having a flow rate of 2300 m$^3$/h and set up at 65% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen. The fibers were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the diamond-cut template thereby forming a three-dimensional nonwoven fibrous web supported by the support layer underneath.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber. The resulting patterned air-laid fibrous nonwoven fibrous web was an open, lofty nonwoven fibrous web.

Example 3—Patterned Air-Laid Nonwoven Fibrous Web

The bicomponent fibers and the hammer-milled BMF scrap were fed into a split pre-opening and blending chamber with two rotating spike rollers with a conveyor belt with a width of 0.6 m at a velocity 1 m/min. The bicomponent fibers were fed with a mass flowrate of 100 g/min to this chamber. The hammer-milled BMF scrap was fed with a mass flowrate of 100 g/min to this chamber. Thereafter, the blend was fed into the top of the forming chamber having a blower having a flow rate of 2300 m$^3$/h and set up at 55% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen. The fibers were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a patterned air-laid fibrous nonwoven fibrous web supported by the support layer underneath.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber. The resulting patterned air-laid fibrous nonwoven fibrous web of the web was an open, lofty web.

Preparation of Articles Comprising Patterned Nonwoven Fibrous Webs Including Chemically Active Particulates Example 4—Patterned Air-Laid Nonwoven Chemically Active Particulate-Loaded Fibrous Web The bicomponent fibers and the hammer-milled BMF scrap were fed into a split pre-opening and blending chamber with two rotating spike rollers with a conveyor belt with a width of 0.6 m at a velocity 1 m/min. The bicomponent fibers were fed with a mass flowrate of 200 g/min to this chamber. The hammer-milled BMF scrap was fed with a mass flowrate of 200 g/min to this chamber. Thereafter, the blend was fed into the top of the forming chamber having a blower having a flow rate of 2300 m$^3$/h and set up at 60% of its nominal capacity with the same conveyor belt. The fibers were opened and fluffed in the top of the chamber and then fell through the upper rows of spikes rollers and endless belt screen to the bottom of the forming chamber passing thereby the lower rows of spike rollers and again the same endless belt screen.

The activated carbon particulates were fed to the lower end of the forming chamber at a mass flowrate of 400 g/min and delivery air setting of 22 psi (about 151.7 kPa). A K-Tron feeder, type K-SFS-24/6 (commercially available from K-Tron Schweiz AG in Niederlenz, Switzerland), was used to deliver the activated carbon particulates. The fibers and particulates were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the diamond-cut template thereby forming a three-dimensional nonwoven fibrous web containing the activated carbon particulates supported by the support layer underneath.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber.

The resulting patterned air-laid fibrous nonwoven fibrous web of the web was an open, lofty web and was visually observed to have activated carbon particulates homogenously distributed within the obtained patterned air-laid fibrous nonwoven fibrous web.

Example 5—Patterned Air-Laid Nonwoven Chemically Active Particulate-Loaded Fibrous Web The bicomponent fibers and the 12 denier nylon fibers were fed into a split pre-opening and blending chamber with two rotating spike rollers with a conveyor belt with a width of 0.6 m at a velocity 1 m/min. The bicomponent fibers were fed with a mass flowrate of 200 g/min to this chamber. The hammer-milled BMF scrap were fed with a mass flowrate of 200 g/min to this chamber. Thereafter, the blend was fed into the top of the forming chamber having a blower having a flow rate of 2300 m³/h and set up at 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen. The activated carbon particulates were fed to the lower end of the forming chamber at a mass flowrate of 700 g/min and delivery air setting of 22 psi (about 151.7 kPa). A K-Tron feeder, type K-SFS-24/6 (commercially available from K-Tron Schweiz AG in Niederlenz, Switzerland), was used to deliver the activated carbon particulates. The fibers and particulates were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the diamond-cut template thereby forming a three-dimensional nonwoven fibrous web containing the activated carbon particulates supported by the support layer underneath.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber.

The resulting patterned air-laid fibrous nonwoven fibrous web of the web was an open, lofty web and was visually observed to have activated carbon particulates homogenously distributed within the obtained patterned air-laid fibrous nonwoven fibrous web.

Example 6—Patterned Air-Laid Nonwoven Chemically Active Particulate-Loaded Fibrous Web The bicomponent fibers were fed into a split pre-opening and blending chamber with two rotating spike rollers with a conveyor belt with a width of 0.6 m at a velocity 2 m/min. The bicomponent fibers were fed with a mass flowrate of 200 g/min to this chamber onto this conveyor belt. Thereafter, the fibers were fed into the top of the forming chamber having a blower having a flow rate of 2300 m³/h and set up at 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen. The activated carbon particulates were fed to the lower end of the forming chamber at a mass flowrate of 400 g/min and delivery air setting of 22 psi (about 151.7 kPa). A K-Tron feeder, type K-SFS-24/6 (commercially available from K-Tron Schweiz AG in Niederlenz, Switzerland), was used to deliver these activated carbon particulates. The fibers and particulates were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the diamond-cut template thereby forming a three-dimensional nonwoven fibrous web containing the activated carbon particulates supported by the support layer underneath.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber. The resulting patterned air-laid fibrous nonwoven fibrous web of the web was an open, lofty web and was visually observed to have activated carbon particulates homogenously distributed within the obtained patterned air-laid fibrous nonwoven fibrous web.

Exemplary fluid filtration or insulation articles were prepared using the nonwoven fibrous webs, including chemically active particulates, described in Examples 2 and 6

Example 7—Fluid Filtration Article

The base of patterned air-laid nonwoven fibrous web of Example 2 was laminated to the base surface of the activated carbon containing nonwoven fibrous web of Example 6 to form a composite filter comprising a particulate filter layer and a gas adsorption layer. 3M Spray mount adhesive (commercially available from 3M Company, St. Paul, Minn.) was applied to the bottom surface of the nonwoven web of Example 2 in an amount of about 5 g/m² and then, particulate filter layer comprising the meltblown nonwoven web was pressed onto the gas adsorption layer by hand. This filtration article may be used for flow-through or flow-by applications.

Preparation of Articles Comprising Patterned Nonwoven Fibrous Webs Including Abrasive Particulates Materials Fibers Bicomponent fiber of the type TREVIRA T255 (commercially available from Trevira GmbH, Bobingen, Germany) having 1.3 denier and 6 mm length.

Single-component fiber having 15 denier and 6 mm length (commercially available from MiniFIBERS, Inc., Johnson City, Tenn., USA).

Patterned Collectors

Figure 5G:
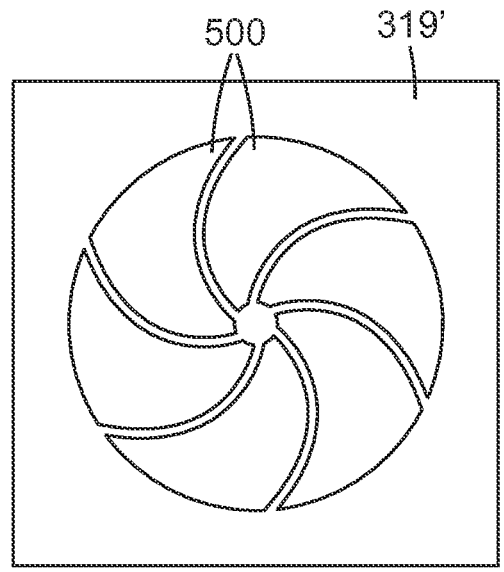

An acrylic collector was constructed from a rectangular sheet 319' of 0.35-inch (8.89 mm) thick acrylic 22 inches×24 inches (558.8 mm×609.6 mm) in which a six helically arranged wedges 500 were cut out forming a 17 inch (431.8 mm) diameter disc with 0.5 inch (12.7 mm) wide helical arms connected by a central disk 2 inches (50.8 mm) in diameter, as generally illustrated by FIG. 5G.

Figure 5H:
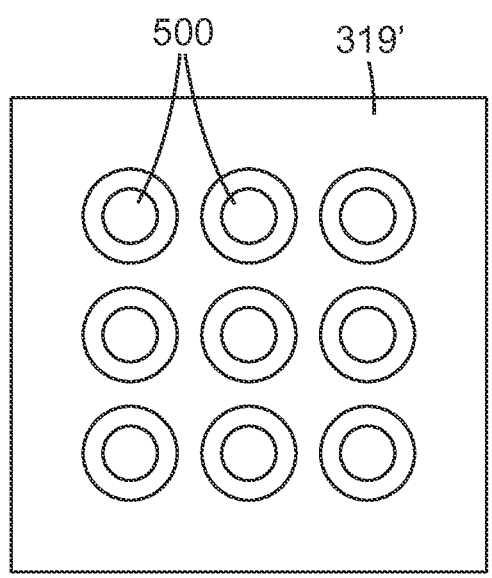

A polycarbonate collector was constructed in a 12 inch× 12 inch×0.5 inch (304.8 mm×304.8 mm×12.7 mm) polycarbonate sheet 319'. The patterned collector had a 3×3 array of tapered circular holes 500, each hole 1.38 inches (34.9 mm) in diameter at the base, each hole having an inwardly sloping sidewall angle of 45°, as generally illustrated by FIG. 5H.

Various samples were made with the process as described, plus a template made with high temperature silicone rubber 2617T41 (available from McMaster Can, Chicago, Ill.). The pattern shown in FIG. 6 was water-jet cut into silicone sheets of ¼ inch thick, and ⅝ inch thick. The patterned template (collector) was placed on the process conveyor, and fed into the web-forming chamber where the respective fibers were formed into a web, in, and on top of the template. The assembly was then conveyed into the bonding oven, where the fiber components were fused together.

Example 8—Patterned Air-Laid Nonwoven Particulate-Loaded Fibrous Web

Binder fiber in a concentric polyethylene sheath and polypropylene core (32 denier×6 mm length, uncrimped, from Fiber Innovation Technology, Merge Type 251) was used, with the ¼ inch thick template, to form a bonded web completely filling the template cavities, with sharp, straight edges. The vacuum force of the process pulled the fibers down into an orientation substantially parallel with the plane of the process conveyor. The sample was made with an average web basis weight of 312 grams per square meter. A condensing roll was used immediately after exit from the bonding oven (290° F., 143° C.), to form a continuous dense layer from the web material above the template layer. The template itself prevented the web inside the cut out pattern from becoming densified.

Example 9—Patterned Air-Laid Nonwoven Particulate-Loaded Fibrous Web

A similar binder fiber (32 denier×6 mm length, crimped, from Fiber Innovation Technology, Merge Type 251) was used, this time with the ⅝ inch thick template as the collector. Again, the bonded web completely filling the template cavities, with sharp, straight edges, with an average weight of 622 grams per square meter.

Example 10—Patterned Air-Laid Nonwoven Particulate-Loaded Fibrous Web

A blend of binder fibers, and standard staple fibers could also be used to form a patterned web. Here, the sample was made with 20% concentric co-polyester sheath and polyester core (15 denier×51 mm length, crimped, from Huvis Fibers, Type LMF), 20% co-polyester sheath and polyester core (2 denier×¼ inch, uncrimped, from MiniFibers), and 60% polyester staple fiber (12 denier×¼ inch, uncrimped from MiniFibers). Average web basis weight was 332 grams per square meter, and a bonding oven temperature of 310 F was used. In this case, the addition of the longer binder fibers resulted in a web with the pattern features having rounded corners.

Example 11—Patterned Air-Laid Nonwoven Particulate-Loaded Fibrous Web

A patterned composite structure can also be made by incorporating large particles into the template prior to web formation. Here, a single layer of elastomer thermoplastic resin particles (Dow Engage DSH 8501 polyolefin elastomer, nominally 3 mm in diameter) were placed into the template holes, and a web formed on top, with the polyethylene sheath and polypropylene core (32 denier×6 mm length, uncrimped, from Fiber Innovation Technology, Merge Type 251). After bonding at 290 F, all components were fused together into a flexible, patterned structure, with an average fiber web weight of 312, and a total web weight of 1065 grams per square meter.

Example 12—Patterned Air-Laid Nonwoven Particulate-Loaded Fibrous Web

Additional patterned composite structures can be made by use of materials with suitable bonding properties. Inorganic particles (3M Color Quartz, Type T), were mixed with polyethylene ionomer (Dow Amplify EA 103), and placed into the bottom of the template mold, as in Example 4. A web was formed into the template with the polyethylene sheath and polypropylene core (32 denier×6 mm length, uncrimped, from Fiber Innovation Technology, Merge Type 251). After bonding at 290 F, all components were fused together into a flexible, patterned structure, with an average fiber web weight of 312, and a total web basis weight of 1487 grams per square meter (gsm).

Example 13—Patterned Air-Laid Nonwoven Particulate-Loaded Fibrous Web

A patterned air-laid nonwoven fibrous web was prepared by feeding single-component and bicomponent fibers into pre-opening chamber with two rotating spike rollers with a conveyor belt with a width of 0.6 m at a velocity 1 m/min. The bicomponent fibers (TreviraT255) were fed with a mass flowrate of 114 g/min to this chamber, and the single-component fibers were fed with a mass flowrate of 171 g/min onto the same conveyor belt to obtain a basis weight of 664 g/m² in the part (measured by trimming the excess off the disk). Thereafter, the blend was fed into the top of the forming chamber having a blower having a flow rate of 2300 m³/h and set up at 55 to 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen. The materials were pulled down into the patterned collector pattern on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire and beneath the patterned collector running at the lower end of the forming chamber moving at a speed of 0.7 m/min. The materials were collected in and above the patterned collector above the top surface of the support layer thereby forming a three-dimensional fiber nonwoven, patterned fibrous web containing the bicomponent and single-component fibers supported by the support layer underneath.

The web with patterned collector was then conveyed into a gas oven (127° C.) with a line speed of 1 m/min, which melts the sheath of the bicomponent fibers. In this example, the web was removed after cooling down to just above room temperature.

The resulting patterned air-laid fibrous nonwoven fibrous web of the web was an open, lofty web in areas contacting the support web and compressed in areas atop the spiral arms and central disk of the patterned collector. The fibers generally appeared to be aligned in the plane of the support layer. This patterned fibrous web was made like the nonwoven patterned fibrous web of the previous example, except the patterned collector contained an array of holes with sloped sidewalls as described above. The resulting web had a Average web basis weight of 188.4 g/m².

Preparation of Articles Comprising Patterned Nonwoven Fibrous Webs Including Abrasive Particulates and an Optional Binder Materials
  Non-patterned Control: 3M Floor pad sample cut to approximately 3 in×4.25 in×0.85 in.
  Patterned Web: The web of Example 2, cut to approximately 5 in×5 in×0.75 in.
  Latex 1: Rhoplex HA-16 Emulsion (Rohm Haas Owned by Dow, Midland, Mich., USA).
  Latex 2: Styrofan ND 593 (BASF, Florham Park, N.J.).
  Abrasive particulate: 60 grit aluminum oxide powder (3M Company, St. Paul. Minn.).
  Epoxy Binder: 3M SCOTCH-WELD epoxy adhesive 2214 Regular, (3M Company, St. Paul, Minn.)

Example 14 (Comparative)—Non-Patterned Nonwoven Fibrous Web

A Control sample was placed into an aluminum tray with approximately 30 g of Latex 1, approximately 0.125-in deep. The sample was pressed manually compressing it to approximately 33% of its original height. The sample was then turned over and compressed similarly. Thereafter, the sample was passed between two rollers of a Benchtop Laboratory Laminator (ChemInstruments, Fairfield, Ohio, USA) covered with PET film, and set to a gap of approximately 0.25 in, removing excess latex. The sample was then placed in an oven at 155° C. for 25 minutes to dry. The sample was weighed before and after drying to determine the amount of latex applied.

Example 15—Patterned Air-Laid Nonwoven Abrasive Particulate-Loaded Fibrous Web

Figure 7A:
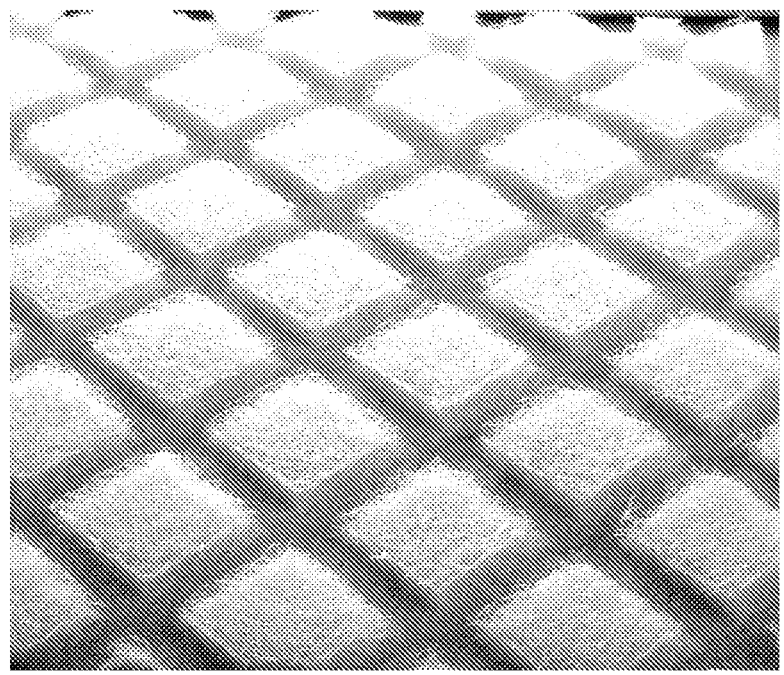
FIGS. 7A-7F are photographs of various exemplary patterned air-laid nonwoven fibrous webs according to certain illustrative embodiments of the present disclosure.
Figure 7B:
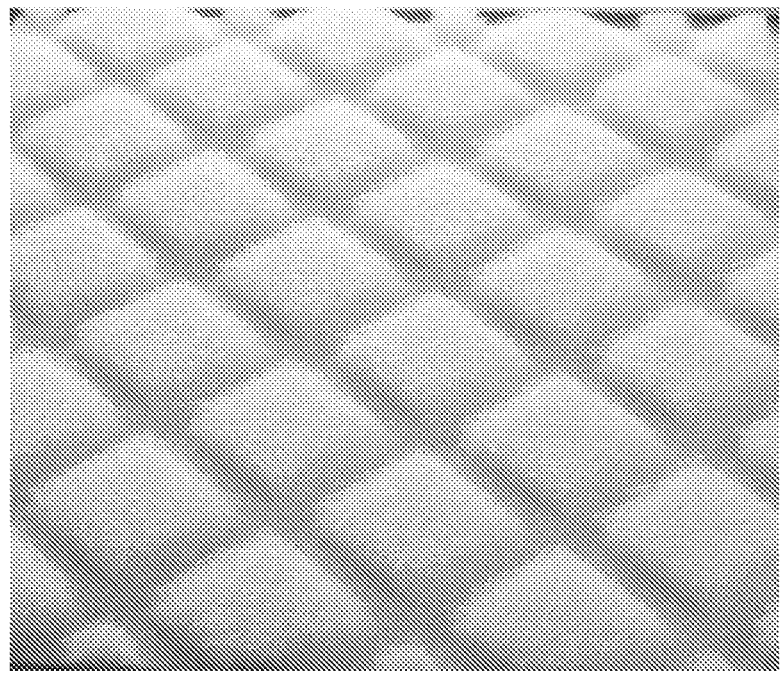
Figure 7C:
Figure 7D:
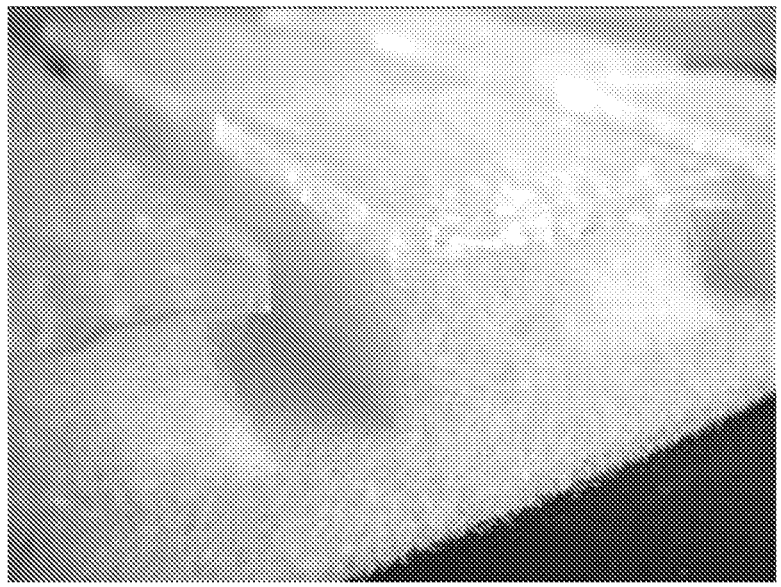
Figure 7E:
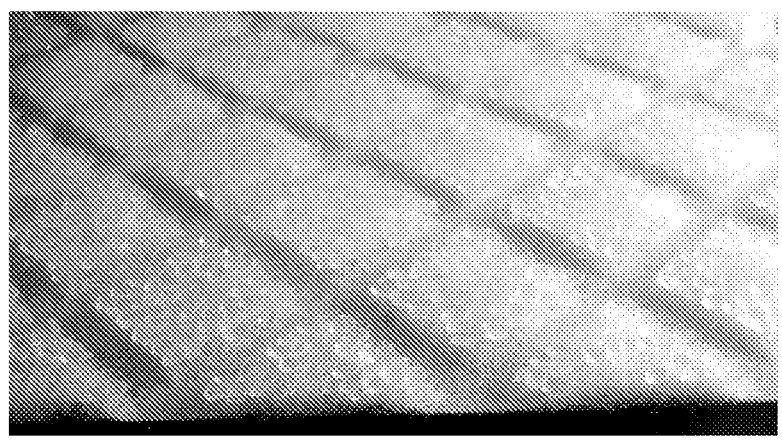
Figure 7F:

Same procedure as Example 14, but the nonwoven was the patterned web, the sample was not flipped during coating, and 40 g of latex was placed in the Al pan. A portion of the result patterned air-laid nonwoven fibrous web is shown in FIG. 7F.

Example 16 (Comparative)—Non-Patterned Nonwoven Fibrous Web

Same as Example 14, but with Latex 2 added.

Example 17—Patterned Air-Laid Nonwoven Abrasive Particulate-Loaded Fibrous Web

Same as Example 15, but with Latex 2 added.

Example 18 (Comparative)—Non-Patterned Nonwoven Fibrous Web

Same as Example 14, but 5 g of 60 grit aluminum oxide was added with the 30 g of Latex 1.

Example 319—Patterned Air-Laid Nonwoven Abrasive Particulate-Loaded Fibrous Web

Same as Example 15, but with 5 g of 60 grit aluminum oxide added to 36 g of Latex 1.

The results are summarized in Table 2.

TABLE 2

|  | Web | Latex | Mass Nonwoven (g) | Mass Latex (g) | Mass Al2O3 (g) | Mass After Baking (g) | Coating Weight (%) |
| --- | --- | --- | --- | --- | --- | --- | --- |
| Example 14 (Comparative) | Non-patterned Control | Latex 1 | 10.1 | 30 | NA | 319.4 | 48% |
| Example 15 | Patterned Air-Laid | Latex 1 | 12.8 | 40 | NA | 32 | 60% |

TABLE 2-continued

|  | Web | Latex | Mass Nonwoven (g) | Mass Latex (g) | Mass Al2O3 (g) | Mass After Baking (g) | Coating Weight (%) |
|---|---|---|---|---|---|---|---|
| Example 16 (Comparative) | Non-patterned Control | Latex 2 | 9.4 | 30 | NA | 21.5 | 56% |
| Example 17 | Patterned Air-Laid | Latex 2 | 10.2 | 30 | NA | 24.8 | 59% |
| Example 18 (Comparative) | Non-patterned Control | Latex 1 | 9 | 30 | 5 | 18.7 | 52% |
| Example 319 | Patterned Air-Laid | Latex 1 | 11.7 | 36 | 5 | 29.2 | 60% |

Example 20

The raised features of the patterned air-laid nonwoven fibrous web of Example 2 were coated with approximately 18 g of epoxy using a wooden rod. Approximately 2.5 g of aluminum oxide was sprinkled onto the epoxy-covered features. The epoxy was mixed in using the wooden rod. An additional 2.5 g of aluminum oxide powder was sprinkled onto the epoxy covered features and again mixed. The epoxy was cured at 230° F. (110° C.) for greater than 2 hours until hardened. The results are shown in FIG. 7C-7E.

Example 21

35 g Epoxy was mixed with 16 g of aluminum oxide powder and 6 g of MEK. The dispersion was agitated with a wooded rod in an Al-foil tray until uniformly mixed. The patterned web was dip coated into the dispersion so that the dispersion was imbibed into the nonwoven and at least 50% of the height of the raised features was coated with the epoxy. The epoxy was cured at 230° F. (110° C.) for greater than 2 hours until hardened. A portion of the result patterned air-laid nonwoven fibrous web is shown in FIGS. 7C-7E.

Example 22

This example illustrates forming a patterned air-laid nonwoven fibrous web comprising a very open and flexible 3-dimensional support layer (also referred to as "coil web"), covered and partially filled with a plurality of randomly oriented discrete fibers. Some or all of these randomly oriented discrete fibers are preferably thermo-fusible fibers (single component melty fibers or multi-component (e.g. bi-component or core/sheath, with outer component sheath having a melting point lower than the inner component core) so that the fibers can be secured by bonding the patterned air-laid nonwoven fibrous web after collection, using, for example, a heating step.

The plurality of discrete fibers is air-laid onto the 3-dimensional support layer by combination of gravity and vacuum. The patterned air-laid nonwoven fibrous web may include a plurality of particulates, which may be chemically active particulates. The resulting web can be provided with additional properties through e.g. roll-coating, spraying or any method commonly used to functionalize nonwoven materials.

A 3-dimensional support layer (coil web), Enkamat® 7225 (Enka Tecnica GmbH, Übach-Palenberg, Germany) was passed under the forming chamber on the top surface of the endless forming belt/wire running at the lower end of the forming chamber moving at a speed of about 1 m/min. Short (6 mm) bicomponent Trevira T-255 fibers (Trevira GmbH, Hattersheim, Germany) were opened and fluffed in the top of the forming chamber and then fell through the upper rows of spikes rollers and endless belt screen to the bottom of the forming chamber passing thereby the lower rows of spike rollers and again same the endless belt screen. The materials were pulled down onto the 3-dimensional support layer on a porous endless belt/wire by a combination of gravity and vacuum applied to the forming chamber from the lower end of the porous forming belt/wire.

The web was then conveyed into an electric oven (130-135° C.) with a line speed of 1.1 m/min, which melts the sheath of the bicomponent fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 132° C. in the chambers. The sample was passed once in the chamber. The resulting patterned nonwoven fibrous web had a discernible 3-dimensional pattern on a major surface, and an average basis weight of 330 gsm (in addition to coil web).

Example 23

This patterned air-laid nonwoven fibrous web was prepared as described in Example 22, using a lower feed rate of the bicomponent discrete fibers into the forming chamber. The resulting patterned nonwoven fibrous web had a discernible 3-dimensional pattern on a major surface, and an average basis weight of 165 gsm (in addition to coil web).

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

We claim:

1. A nonwoven fibrous web comprising:
a plurality of randomly oriented discrete fibers defining a plurality of non-hollow projections extending from a major surface of the nonwoven fibrous web, wherein each of the plurality of non-hollow projections exhibits a cross-sectional geometric shape, taken in a direction substantially parallel to the major surface of the nonwoven fibrous web, selected from the group consisting of a circle, an oval, a polygon, an X-shape, a V-shape, a helical-shape, and combinations thereof, and
a plurality of substantially planar land areas formed between each adjoining projection in a plane defined by and substantially parallel with the major surface of the nonwoven fibrous web, wherein the plurality of randomly oriented discrete fibers comprises multi-component fibers having at least a first region having a first melting temperature and a second region having a second melting temperature, further wherein the first melting temperature is less than the second melting temperature; and
a plurality of particulates bonded to at least a portion of the randomly oriented discrete fibers, wherein the multi-component fibers are present in the nonwoven fibrous web in an amount greater than 0% and less than 3% by weight of the randomly oriented discrete fibers, further wherein the multi-component fibers are present in the nonwoven fibrous web in an amount greater than 0% and less than 10% by weight of the total weight of the nonwoven fibrous web;
further wherein at least a portion of the oriented discrete fibers are bonded together at a plurality of intersection points with the first region of the multi-component fibers; and
additionally wherein a binder resin coated on the plurality of non-hollow projections and not on the land areas, wherein the binder resin does not substantially occlude a surface of particulates located on the non-hollow projections.

2. The nonwoven fibrous web of claim 1, wherein the multi-component fibers comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

3. The nonwoven fibrous web of claim 1, wherein at least a portion of the particulates is bonded to the at least first region of the at least a portion of the multi-component fibers.

4. The nonwoven fibrous web of claim 1, wherein the plurality of particulates has a population median diameter less than one micrometer, and at least a portion of the particulates is bonded to the at least first region of at least a portion of the multi-component fibers.

5. The nonwoven fibrous web of claim 4, wherein the plurality of particulates comprises benefiting particulates selected from the group consisting of abrasive particulates, metal particulates, detergent particulates, surfactant particulates, biocide particulates, adsorbent particulates, absorbent particulates, microcapsules, and combinations thereof.

6. The nonwoven fibrous web of claim 1, wherein the plurality of non-hollow projections forms a two-dimensional array on the major surface of the nonwoven fibrous web.

7. The nonwoven fibrous web of claim 6, wherein the nonwoven fibrous web comprises a population of sub-micrometer fibers having a median fiber diameter of less than 1 µm, optionally wherein the nonwoven fibrous web is formed by melt blowing, melt spinning, electrospinning, plexifilament formation, gas jet fibrillation, fiber splitting, or a combination thereof.

8. A method of making a nonwoven fibrous web, comprising:
providing a forming chamber having an upper end and a lower end;
introducing a plurality of fibers into the upper end of the forming chamber;
introducing a plurality of chemically active particulates selected from activated carbon particulates, activated alumina particulates, silica gel particulates, desiccant particulates, anion exchange resin particulates, cation exchange resin particulates, molecular sieve particulates, diatomaceous earth particulates, anti-microbial compound particulates, and combinations thereof into the forming chamber and mixing the plurality of fibers with the plurality of chemically active particulates within the forming chamber to form a fibrous particulate mixture;
transporting the fibrous particulate mixture to the lower end of the forming chamber as a population of substantially discrete fibers;
capturing on a collector having a patterned surface the population of substantially discrete fibers as a nonwoven fibrous web having an identifiable pattern on a major surface;
securing at least a portion of the chemically active particulates to the nonwoven fibrous web,
wherein more than 0% and less than 10% wt. of the nonwoven fibrous web comprises multi-component fibers comprising at least a first region having a first melting temperature and a second region having a second melting temperature,
wherein the first melting temperature is less than the second melting temperature, further wherein the multi-component fibers are present in the nonwoven fibrous web in an amount greater than 0% and less than 10% by weight of the total weight of the nonwoven fibrous web, and
additionally wherein at least a portion of the multi-component fibers are bonded together at a plurality of intersection points with the first region of the multi-component fibers without the use of an adhesive prior to removal of the web from the patterned collector surface, thereby causing the fibrous web to retain the identifiable pattern, and
wherein the identifiable pattern comprises a plurality of non-hollow projections extending from a major surface of the nonwoven fibrous web, and a plurality of substantially planar land areas formed between each adjoining projection in a plane defined by and substantially parallel with the major surface,
further wherein a binder resin is coated on the plurality of non-hollow projections and not on the land areas, and wherein the binder resin does not substantially occlude a surface of particulates located on the non-hollow projections, and
additionally wherein each of the plurality of non-hollow projections exhibits a cross-sectional geometric shape, taken in a direction substantially parallel to the first major surface, selected from the group consisting of a circle, an oval, a polygon, an X-shape, a V-shape, a helical-shape, and combinations thereof.

9. The method of claim 8, wherein the patterned surface of the collector comprises a plurality of geometrically shaped perforations extending through the collector, wherein the plurality of geometrically shaped perforations have a shape selected from the group consisting of circular, oval, polygonal, X-shape, V-shape, helical, and combinations thereof, and further wherein capturing the population of fibers comprises drawing a vacuum through the perforated patterned collector surface.

* * * * *

UNITED STATES PATENT AND TRADEMARK OFFICE
CERTIFICATE OF CORRECTION

PATENT NO. : 9,771,675 B2
APPLICATION NO. : 13/808106
DATED : September 26, 2017
INVENTOR(S) : Gordon Altshuler It is certified that error appears in the above-identified patent and that said Letters Patent is hereby corrected as shown below:

In the Specification

Column 6
Line 48, Delete "by" and insert -- be --, therefor.
Line 50, Delete "autogenous" and insert -- autogeneous --, therefor.

Column 10
Line 5, After "below" insert -- . --.

Column 12
Line 27, Delete "Celbond®" and insert -- Cellbond® --, therefor.
Line 28, Delete "Celbond®" and insert -- Cellbond® --, therefor.

Column 14
Line 63, Delete "McCuthcheon's" and insert -- McCutcheon's --, therefor.

Column 15
Line 5, Delete "benzylkoniumchloride," and insert -- benzalkoniumchloride, --, therefor.

Column 17
Line 43, Delete "benzylkoniumchloride," and insert -- benzalkoniumchloride, --, therefor.

Column 36
Line 14, Delete "the a" and insert -- the --, therefor.

Column 45
Line 45 (approx.), Delete "@ l" and insert -- @ 1 --, therefor.

Signed and Sealed this
Twenty-seventh Day of March, 2018

Andrei Iancu
*Director of the United States Patent and Trademark Office*

Column 51
Line 10, After "6" insert -- . --.
Line 51, Delete "Can," and insert -- Carr, --, therefor.

Column 55
Line 27, Delete "FIG." and insert -- FIGS. --, therefor.